(12) United States Patent
Singh et al.

(10) Patent No.: US 12,231,308 B2
(45) Date of Patent: *Feb. 18, 2025

(54) UNIQUE ID GENERATION FOR SENSORS

(71) Applicant: Cisco Technology, Inc., San Jose, CA (US)

(72) Inventors: Abhishek Ranjan Singh, Pleasanton, CA (US); Shih-Chun Chang, San Jose, CA (US); Varun Sagar Malhotra, Sunnyvale, CA (US); Hai Trong Vu, San Jose, CA (US); Jackson Ngoc Ki Pang, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,807

(22) Filed: May 24, 2023

(65) Prior Publication Data

US 2023/0300044 A1    Sep. 21, 2023

Related U.S. Application Data

(63) Continuation of application No. 16/941,426, filed on Jul. 28, 2020, now Pat. No. 11,695,659, which is a
(Continued)

(51) Int. Cl.
*H04L 9/40*    (2022.01)
*G06F 3/0482*    (2013.01)
(Continued)

(52) U.S. Cl.
CPC .......... *H04L 43/045* (2013.01); *G06F 3/0482* (2013.01); *G06F 3/04842* (2013.01);
(Continued)

(58) Field of Classification Search
CPC ..... H04L 43/045; H04L 1/242; H04L 9/0866; H04L 9/3239; H04L 9/3242;
(Continued)

(56) References Cited

U.S. PATENT DOCUMENTS 3,762,951 A    10/1973  Hetznecker et al.
5,086,385 A     2/1992  Launey et al.
(Continued)

FOREIGN PATENT DOCUMENTS

CA    2884785 C   * 10/2022   ............... G01K 1/02
CN    1486555 A     3/2004
(Continued)

OTHER PUBLICATIONS

Lu Z., et al., "Cluster-based Simulated Annealing for Mapping Cores onto 2D Mesh Networks on Chip," IEEE Workshop on Design and Diagnostics of Electronic Circuits and Systems, Apr. 16-18, 2008, 6 Pages.
(Continued)

*Primary Examiner* — Sakinah White Taylor
(74) *Attorney, Agent, or Firm* — Polsinelli P.C.

(57) ABSTRACT

Systems, methods, and computer-readable media are provided for generating a unique ID for a sensor in a network. Once the sensor is installed on a component of the network, the sensor can send attributes of the sensor to a control server of the network. The attributes of the sensor can include at least one unique identifier of the sensor or the host component of the sensor. The control server can determine a hash value using a one-way hash function and a secret key, send the hash value to the sensor, and designate the hash value as a sensor ID of the sensor. In response to receiving the sensor ID, the sensor can incorporate the sensor ID in subsequent communication messages. Other components of the network can verify the validity of the sensor using a hash
(Continued)

of the at least one unique identifier of the sensor and the secret key.

20 Claims, 8 Drawing Sheets

Related U.S. Application Data continuation of application No. 15/163,605, filed on May 24, 2016, now Pat. No. 10,735,283.

(60) Provisional application No. 62/171,899, filed on Jun. 5, 2015.

(51) Int. Cl.

| | | |
|---|---|---|
| *G06F 3/04842* | (2022.01) | |
| *G06F 3/04847* | (2022.01) | |
| *G06F 9/455* | (2018.01) | |
| *G06F 16/11* | (2019.01) | |
| *G06F 16/13* | (2019.01) | |
| *G06F 16/16* | (2019.01) | |
| *G06F 16/17* | (2019.01) | |
| *G06F 16/174* | (2019.01) | |
| *G06F 16/23* | (2019.01) | |
| *G06F 16/2457* | (2019.01) | |
| *G06F 16/248* | (2019.01) | |
| *G06F 16/28* | (2019.01) | |
| *G06F 16/29* | (2019.01) | |
| *G06F 16/9535* | (2019.01) | |
| *G06F 21/53* | (2013.01) | |
| *G06F 21/55* | (2013.01) | |
| *G06F 21/56* | (2013.01) | |
| *G06N 20/00* | (2019.01) | |
| *G06N 99/00* | (2019.01) | |
| *G06T 11/20* | (2006.01) | |
| *H04J 3/06* | (2006.01) | |
| *H04J 3/14* | (2006.01) | |
| *H04L 1/24* | (2006.01) | |
| *H04L 7/10* | (2006.01) | |
| *H04L 9/08* | (2006.01) | |
| *H04L 9/32* | (2006.01) | |
| *H04L 41/046* | (2022.01) | |
| *H04L 41/0668* | (2022.01) | |
| *H04L 41/0803* | (2022.01) | |
| *H04L 41/0806* | (2022.01) | |
| *H04L 41/0816* | (2022.01) | |
| *H04L 41/0893* | (2022.01) | |
| *H04L 41/12* | (2022.01) | |
| *H04L 41/16* | (2022.01) | |
| *H04L 41/22* | (2022.01) | |
| *H04L 43/02* | (2022.01) | |
| *H04L 43/026* | (2022.01) | |
| *H04L 43/04* | (2022.01) | |
| *H04L 43/045* | (2022.01) | |
| *H04L 43/062* | (2022.01) | |
| *H04L 43/08* | (2022.01) | |
| *H04L 43/0805* | (2022.01) | |
| *H04L 43/0811* | (2022.01) | |
| *H04L 43/0829* | (2022.01) | |
| *H04L 43/0852* | (2022.01) | |
| *H04L 43/0864* | (2022.01) | |
| *H04L 43/0876* | (2022.01) | |
| *H04L 43/0882* | (2022.01) | |
| *H04L 43/0888* | (2022.01) | |
| *H04L 43/10* | (2022.01) | |
| *H04L 43/106* | (2022.01) | |
| *H04L 43/12* | (2022.01) | |
| *H04L 43/16* | (2022.01) | |
| *H04L 45/00* | (2022.01) | |
| *H04L 45/302* | (2022.01) | |
| *H04L 45/50* | (2022.01) | |
| *H04L 45/74* | (2022.01) | |
| *H04L 47/11* | (2022.01) | |
| *H04L 47/20* | (2022.01) | |
| *H04L 47/2441* | (2022.01) | |
| *H04L 47/2483* | (2022.01) | |
| *H04L 47/28* | (2022.01) | |
| *H04L 47/31* | (2022.01) | |
| *H04L 47/32* | (2022.01) | |
| *H04L 61/5007* | (2022.01) | |
| *H04L 67/01* | (2022.01) | |
| *H04L 67/10* | (2022.01) | |
| *H04L 67/1001* | (2022.01) | |
| *H04L 67/12* | (2022.01) | |
| *H04L 67/51* | (2022.01) | |
| *H04L 67/75* | (2022.01) | |
| *H04L 69/16* | (2022.01) | |
| *H04L 69/22* | (2022.01) | |
| *H04W 72/54* | (2023.01) | |
| *H04W 84/18* | (2009.01) | |
| *H04L 67/50* | (2022.01) | |

(52) U.S. Cl.
CPC ...... *G06F 3/04847* (2013.01); *G06F 9/45558* (2013.01); *G06F 16/122* (2019.01); *G06F 16/137* (2019.01); *G06F 16/162* (2019.01); *G06F 16/17* (2019.01); *G06F 16/173* (2019.01); *G06F 16/174* (2019.01); *G06F 16/1744* (2019.01); *G06F 16/1748* (2019.01); *G06F 16/2322* (2019.01); *G06F 16/235* (2019.01); *G06F 16/2365* (2019.01); *G06F 16/24578* (2019.01); *G06F 16/248* (2019.01); *G06F 16/285* (2019.01); *G06F 16/288* (2019.01); *G06F 16/29* (2019.01); *G06F 16/9535* (2019.01); *G06F 21/53* (2013.01); *G06F 21/552* (2013.01); *G06F 21/556* (2013.01); *G06F 21/566* (2013.01); *G06N 20/00* (2019.01); *G06N 99/00* (2013.01); *G06T 11/206* (2013.01); *H04J 3/0661* (2013.01); *H04J 3/14* (2013.01); *H04L 1/242* (2013.01); *H04L 7/10* (2013.01); *H04L 9/0866* (2013.01); *H04L 9/3239* (2013.01); *H04L 9/3242* (2013.01); *H04L 41/046* (2013.01); *H04L 41/0668* (2013.01); *H04L 41/0803* (2013.01); *H04L 41/0806* (2013.01); *H04L 41/0816* (2013.01); *H04L 41/0893* (2013.01); *H04L 41/12* (2013.01); *H04L 41/16* (2013.01); *H04L 41/22* (2013.01); *H04L 43/02* (2013.01); *H04L 43/026* (2013.01); *H04L 43/04* (2013.01); *H04L 43/062* (2013.01); *H04L 43/08* (2013.01); *H04L 43/0805* (2013.01); *H04L 43/0811* (2013.01); *H04L 43/0829* (2013.01); *H04L 43/0841* (2013.01); *H04L 43/0858* (2013.01); *H04L 43/0864* (2013.01); *H04L 43/0876* (2013.01); *H04L 43/0882* (2013.01); *H04L 43/0888* (2013.01); *H04L 43/10* (2013.01); *H04L 43/106* (2013.01); *H04L 43/12* (2013.01); *H04L 43/16* (2013.01); *H04L 45/306* (2013.01); *H04L 45/38* (2013.01); *H04L 45/46* (2013.01); *H04L 45/507* (2013.01); *H04L 45/66* (2013.01);

H04L 45/74 (2013.01); H04L 47/11 (2013.01);
H04L 47/20 (2013.01); H04L 47/2441
(2013.01); H04L 47/2483 (2013.01); H04L
47/28 (2013.01); H04L 47/31 (2013.01);
H04L 47/32 (2013.01); H04L 61/5007
(2022.05); H04L 63/0227 (2013.01); H04L
63/0263 (2013.01); H04L 63/06 (2013.01);
H04L 63/0876 (2013.01); H04L 63/1408
(2013.01); H04L 63/1416 (2013.01); H04L
63/1425 (2013.01); H04L 63/1433 (2013.01);
H04L 63/1441 (2013.01); H04L 63/145
(2013.01); H04L 63/1458 (2013.01); H04L
63/1466 (2013.01); H04L 63/16 (2013.01);
H04L 63/20 (2013.01); H04L 67/01 (2022.05);
H04L 67/10 (2013.01); H04L 67/1001
(2022.05); H04L 67/12 (2013.01); H04L 67/51
(2022.05); H04L 67/75 (2022.05); H04L 69/16
(2013.01); H04L 69/22 (2013.01); H04W
72/54 (2023.01); H04W 84/18 (2013.01);
G06F 2009/4557 (2013.01); G06F 2009/45587
(2013.01); G06F 2009/45591 (2013.01); G06F
2009/45595 (2013.01); G06F 2221/033
(2013.01); G06F 2221/2101 (2013.01); G06F
2221/2105 (2013.01); G06F 2221/2111
(2013.01); G06F 2221/2115 (2013.01); G06F
2221/2145 (2013.01); H04L 67/535 (2022.05)

(58) Field of Classification Search
CPC ............... H04L 41/046; H04L 41/0668; H04L
41/0803; H04L 41/0806; H04L 41/0816;
H04L 41/0893; H04L 41/12; H04L 41/16;
H04L 41/22; H04L 43/02; H04L 43/026;
H04L 43/04; H04L 43/062; H04L 43/08;
H04L 43/0805; H04L 43/0811; H04L
43/0829; H04L 43/0841; H04L 43/0858;
H04L 43/0864; H04L 43/0876; H04L
43/0882; H04L 43/0888; H04L 43/10;
H04L 43/106; H04L 43/12; H04L 43/16;
H04L 45/306; H04L 45/38; H04L 45/46;
H04L 45/507; H04L 45/66; H04L 45/74;
H04L 47/11; H04L 47/20; G06F 16/162;
G06F 16/17; G06F 16/285; G06F 16/122;
G06F 16/137; G06F 16/173; G06F
16/1744; G06F 16/2322; G06F 16/235;
G06F 16/288; G06F 16/9535; G06F
16/1748; G06F 16/2365; G06F 16/24578;
G06F 16/174; G06F 16/248; G06F 16/29;
G06F 3/0482; G06F 3/04842; G06F
3/04847; G06F 9/45558; G06F 21/53;
G06F 21/552; G06F 21/566; G06N 20/00;
G06N 99/00; G06T 11/206; H04J 3/0661;
H04J 3/14
USPC ........................................................ 713/168
See application file for complete search history.

(56) References Cited

U.S. PATENT DOCUMENTS

| | | |
|---|---|---|
| 5,319,754 A | 6/1994 | Meinecke et al. |
| 5,400,246 A | 3/1995 | Wilson et al. |
| 5,436,909 A | 7/1995 | Dev et al. |
| 5,555,416 A | 9/1996 | Owens et al. |
| 5,726,644 A | 3/1998 | Jednacz et al. |
| 5,742,803 A | 4/1998 | Igarashi et al. |
| 5,742,829 A | 4/1998 | Davis et al. |
| 5,751,914 A | 5/1998 | Coley et al. |
| 5,794,047 A | 8/1998 | Meier |
| 5,822,731 A | 10/1998 | Schultz |
| 5,831,848 A | 11/1998 | Rielly et al. |
| 5,903,545 A | 5/1999 | Sabourin et al. |
| 6,012,096 A | 1/2000 | Link et al. |
| 6,026,362 A | 2/2000 | Kim et al. |
| 6,085,243 A | 7/2000 | Fletcher et al. |
| 6,115,462 A | 9/2000 | Servi et al. |
| 6,141,595 A | 10/2000 | Gloudeman et al. |
| 6,144,962 A | 11/2000 | Weinberg et al. |
| 6,204,850 B1 | 3/2001 | Green |
| 6,215,898 B1 | 4/2001 | Woodfill et al. |
| 6,230,312 B1 | 5/2001 | Hunt |
| 6,239,699 B1 | 5/2001 | Ronnen |
| 6,247,058 B1 | 6/2001 | Miller et al. |
| 6,249,241 B1 | 6/2001 | Jordan et al. |
| 6,279,035 B1 | 8/2001 | Brown et al. |
| 6,295,527 B1 | 9/2001 | McCormack et al. |
| 6,307,837 B1 | 10/2001 | Ichikawa et al. |
| 6,330,562 B1 | 12/2001 | Boden et al. |
| 6,338,131 B1 | 1/2002 | Dillon |
| 6,351,843 B1 | 2/2002 | Berkley et al. |
| 6,353,775 B1 | 3/2002 | Nichols |
| 6,381,735 B1 | 4/2002 | Hunt |
| 6,499,137 B1 | 12/2002 | Hunt |
| 6,525,658 B2 | 2/2003 | Streetman et al. |
| 6,546,420 B1 | 4/2003 | Lemler et al. |
| 6,546,553 B1 | 4/2003 | Hunt |
| 6,597,663 B1 | 7/2003 | Rekhter |
| 6,611,896 B1 | 8/2003 | Mason, Jr. et al. |
| 6,629,123 B1 | 9/2003 | Hunt |
| 6,654,750 B1 | 11/2003 | Adams et al. |
| 6,718,414 B1 | 4/2004 | Doggett |
| 6,728,779 B1 | 4/2004 | Griffin et al. |
| 6,751,663 B1 | 6/2004 | Farrell et al. |
| 6,774,899 B1 | 8/2004 | Ryall et al. |
| 6,801,878 B1 | 10/2004 | Hintz et al. |
| 6,816,461 B1 | 11/2004 | Scrandis et al. |
| 6,847,993 B1 | 1/2005 | Novaes et al. |
| 6,848,106 B1 | 1/2005 | Hipp |
| 6,925,490 B1 | 8/2005 | Novaes et al. |
| 6,958,998 B2 | 10/2005 | Shorey |
| 6,965,861 B1 | 11/2005 | Dailey et al. |
| 6,983,323 B2 | 1/2006 | Cantrell et al. |
| 6,996,808 B1 | 2/2006 | Niewiadomski et al. |
| 6,996,817 B2 | 2/2006 | Birum et al. |
| 7,002,464 B2 | 2/2006 | Bruemmer et al. |
| 7,024,468 B1 | 4/2006 | Meyer et al. |
| 7,089,583 B2 | 8/2006 | Mehra et al. |
| 7,096,368 B2 | 8/2006 | Kouznetsov et al. |
| 7,111,055 B2 | 9/2006 | Falkner |
| 7,120,934 B2 | 10/2006 | Ishikawa |
| 7,133,923 B2 | 11/2006 | MeLampy et al. |
| 7,162,643 B1 | 1/2007 | Sankaran et al. |
| 7,167,483 B1 | 1/2007 | Sharma et al. |
| 7,181,769 B1 | 2/2007 | Keanini et al. |
| 7,185,103 B1 | 2/2007 | Jain |
| 7,194,664 B1 | 3/2007 | Fung et al. |
| 7,203,740 B1 | 4/2007 | Putzolu et al. |
| 7,263,689 B1 | 8/2007 | Edwards et al. |
| 7,296,288 B1 | 11/2007 | Hill et al. |
| 7,302,487 B2 | 11/2007 | Ylonen et al. |
| 7,327,735 B2 | 2/2008 | Robotham et al. |
| 7,331,060 B1 | 2/2008 | Ricciulli |
| 7,337,206 B1 | 2/2008 | Wen et al. |
| 7,349,761 B1 | 3/2008 | Cruse |
| 7,353,507 B2 | 4/2008 | Gazdik et al. |
| 7,353,511 B1 | 4/2008 | Ziese |
| 7,356,679 B1 | 4/2008 | Le et al. |
| 7,360,072 B1 | 4/2008 | Soltis et al. |
| 7,370,092 B2 | 5/2008 | Aderton et al. |
| 7,395,195 B2 | 7/2008 | Suenbuel et al. |
| 7,444,404 B2 | 10/2008 | Wetherall et al. |
| 7,453,879 B1 | 11/2008 | Lo |
| 7,454,486 B2 | 11/2008 | Kaler et al. |
| 7,466,681 B2 | 12/2008 | Ashwood-Smith et al. |
| 7,467,205 B1 | 12/2008 | Dempster et al. |
| 7,496,040 B2 | 2/2009 | Seo |
| 7,496,575 B2 | 2/2009 | Buccella et al. |
| 7,496,661 B1 | 2/2009 | Morford et al. |

(56) References Cited

U.S. PATENT DOCUMENTS

| | | |
|---|---|---|
| 7,523,465 B2 | 4/2009 | Aamodt et al. |
| 7,523,493 B2 | 4/2009 | Liang et al. |
| 7,530,105 B2 | 5/2009 | Gilbert et al. |
| 7,539,770 B2 | 5/2009 | Meier |
| 7,568,107 B1 | 7/2009 | Rathi et al. |
| 7,571,478 B2 | 8/2009 | Munson et al. |
| 7,606,203 B1 | 10/2009 | Shabtay et al. |
| 7,610,330 B1 | 10/2009 | Quinn et al. |
| 7,633,942 B2 | 12/2009 | Bearden et al. |
| 7,644,438 B1 | 1/2010 | Dash et al. |
| 7,676,570 B2 | 3/2010 | Levy et al. |
| 7,681,131 B1 | 3/2010 | Quarterman et al. |
| 7,693,947 B2 | 4/2010 | Judge et al. |
| 7,742,406 B1 | 6/2010 | Muppala |
| 7,742,413 B1 | 6/2010 | Bugenhagen |
| 7,743,242 B2 | 6/2010 | Oberhaus et al. |
| 7,752,307 B2 | 7/2010 | Takara |
| 7,774,498 B1 | 8/2010 | Kraemer et al. |
| 7,783,457 B2 | 8/2010 | Cunningham |
| 7,787,480 B1 | 8/2010 | Mehta et al. |
| 7,788,477 B1 | 8/2010 | Huang et al. |
| 7,808,897 B1 | 10/2010 | Mehta et al. |
| 7,813,822 B1 | 10/2010 | Hoffberg |
| 7,840,618 B2 | 11/2010 | Zhang et al. |
| 7,844,696 B2 | 11/2010 | Labovitz et al. |
| 7,844,744 B2 | 11/2010 | Abercrombie et al. |
| 7,864,707 B2 | 1/2011 | Dimitropoulos et al. |
| 7,870,204 B2 | 1/2011 | LeVasseur |
| 7,873,025 B2 | 1/2011 | Patel et al. |
| 7,873,074 B1 | 1/2011 | Boland |
| 7,874,001 B2 | 1/2011 | Beck et al. |
| 7,885,197 B2 | 2/2011 | Metzler |
| 7,895,649 B1 | 2/2011 | Brook et al. |
| 7,904,420 B2 | 3/2011 | Ianni |
| 7,930,752 B2 | 4/2011 | Hertzog et al. |
| 7,934,248 B1 | 4/2011 | Yehuda et al. |
| 7,957,934 B2 | 6/2011 | Greifeneder |
| 7,961,637 B2 | 6/2011 | McBeath |
| 7,970,946 B1 | 6/2011 | Djabarov et al. |
| 7,975,035 B2 | 7/2011 | Popescu et al. |
| 7,990,847 B1 | 8/2011 | Leroy et al. |
| 8,001,610 B1 | 8/2011 | Chickering et al. |
| 8,005,935 B2 | 8/2011 | Pradhan et al. |
| 8,040,232 B2 | 10/2011 | Oh et al. |
| 8,040,822 B2 | 10/2011 | Proulx et al. |
| 8,040,832 B2 | 10/2011 | Nishio et al. |
| 8,056,134 B1 | 11/2011 | Ogilvie |
| 8,069,470 B1 * | 11/2011 | Montenegro ......... H04L 9/3226 726/6 |
| 8,115,617 B2 | 2/2012 | Thubert et al. |
| 8,135,657 B2 | 3/2012 | Kapoor et al. |
| 8,135,847 B2 | 3/2012 | Pujol et al. |
| 8,156,430 B2 | 4/2012 | Newman |
| 8,160,063 B2 | 4/2012 | Maltz et al. |
| 8,179,809 B1 | 5/2012 | Eppstein et al. |
| 8,181,248 B2 | 5/2012 | Oh et al. |
| 8,181,253 B1 | 5/2012 | Zaitsev et al. |
| 8,185,343 B1 | 5/2012 | Fitzgerald et al. |
| 8,185,824 B1 | 5/2012 | Mitchell et al. |
| 8,239,365 B2 | 8/2012 | Salman |
| 8,239,915 B1 | 8/2012 | Satish et al. |
| 8,250,657 B1 | 8/2012 | Nachenberg et al. |
| 8,255,972 B2 | 8/2012 | Azagury et al. |
| 8,266,697 B2 | 9/2012 | Coffman |
| 8,272,875 B1 | 9/2012 | Jurmain |
| 8,280,683 B2 | 10/2012 | Finkler |
| 8,281,397 B2 | 10/2012 | Vaidyanathan et al. |
| 8,291,495 B1 | 10/2012 | Burns et al. |
| 8,296,847 B2 | 10/2012 | Mendonca et al. |
| 8,311,973 B1 | 11/2012 | Zadeh |
| 8,312,540 B1 | 11/2012 | Kahn et al. |
| 8,339,959 B1 | 12/2012 | Moisand et al. |
| 8,356,007 B2 | 1/2013 | Arson et al. |
| 8,365,005 B2 | 1/2013 | Bengtson et al. |
| 8,365,286 B2 | 1/2013 | Poston |
| 8,370,407 B1 | 2/2013 | Devarajan et al. |
| 8,381,289 B1 | 2/2013 | Pereira et al. |
| 8,391,270 B2 | 3/2013 | Van et al. |
| 8,407,164 B2 | 3/2013 | Malik et al. |
| 8,407,798 B1 | 3/2013 | Lotem et al. |
| 8,413,235 B1 | 4/2013 | Chen et al. |
| 8,442,073 B2 | 5/2013 | Skubacz et al. |
| 8,451,731 B1 | 5/2013 | Lee et al. |
| 8,462,212 B1 | 6/2013 | Kundu et al. |
| 8,463,860 B1 | 6/2013 | Guruswamy et al. |
| 8,489,765 B2 | 7/2013 | Vasseur et al. |
| 8,494,985 B1 | 7/2013 | Keralapura et al. |
| 8,499,348 B1 | 7/2013 | Rubin |
| 8,516,590 B1 | 8/2013 | Ranadive et al. |
| 8,527,977 B1 | 9/2013 | Cheng et al. |
| 8,549,635 B2 | 10/2013 | Muttik et al. |
| 8,565,109 B1 | 10/2013 | Poovendran et al. |
| 8,570,861 B1 | 10/2013 | Brandwine et al. |
| 8,572,600 B2 | 10/2013 | Chung et al. |
| 8,572,734 B2 | 10/2013 | McConnell et al. |
| 8,572,735 B2 | 10/2013 | Ghosh et al. |
| 8,572,739 B1 | 10/2013 | Cruz et al. |
| 8,578,491 B2 | 11/2013 | McNamee et al. |
| 8,588,081 B2 | 11/2013 | Salam et al. |
| 8,595,709 B2 | 11/2013 | Rao et al. |
| 8,600,726 B1 | 12/2013 | Varshney et al. |
| 8,612,530 B1 | 12/2013 | Sapovalovs et al. |
| 8,613,084 B2 | 12/2013 | Dalcher |
| 8,615,803 B2 | 12/2013 | Dacier et al. |
| 8,630,316 B2 | 1/2014 | Haba |
| 8,631,464 B2 | 1/2014 | Belakhdar et al. |
| 8,640,086 B2 | 1/2014 | Bonev et al. |
| 8,656,493 B2 | 2/2014 | Capalik |
| 8,661,544 B2 | 2/2014 | Yen et al. |
| 8,677,487 B2 | 3/2014 | Balupari et al. |
| 8,683,389 B1 | 3/2014 | Bar-Yam et al. |
| 8,689,172 B2 | 4/2014 | Amaral et al. |
| 8,706,914 B2 | 4/2014 | Duchesneau |
| 8,713,676 B2 | 4/2014 | Pandrangi et al. |
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,769,084 B2 | 7/2014 | Westerfeld et al. |
| 8,775,577 B1 | 7/2014 | Alford et al. |
| 8,776,180 B2 | 7/2014 | Kumar et al. |
| 8,779,921 B1 | 7/2014 | Curtiss |
| 8,793,255 B1 | 7/2014 | Bilinski et al. |
| 8,805,946 B1 | 8/2014 | Glommen |
| 8,812,448 B1 | 8/2014 | Anderson et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,103 B2 | 9/2014 | Isaacson et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,887,285 B2 | 11/2014 | Jordan et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,924,941 B2 | 12/2014 | Krajec et al. |
| 8,931,043 B2 | 1/2015 | Cooper et al. |
| 8,954,546 B2 | 2/2015 | Krajec |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,063 B2 | 3/2015 | Krajec et al. |
| 8,997,227 B1 | 3/2015 | Mhatre et al. |
| 9,014,047 B2 | 4/2015 | Alcala et al. |

(56) References Cited

U.S. PATENT DOCUMENTS

| | | |
|---|---|---|
| 9,015,716 B2 | 4/2015 | Fletcher et al. |
| 9,043,905 B1 | 5/2015 | Allen et al. |
| 9,071,575 B2 | 6/2015 | Lemaster et al. |
| 9,088,598 B1 | 7/2015 | Zhang et al. |
| 9,104,543 B1 | 8/2015 | Cavanagh et al. |
| 9,110,905 B2 | 8/2015 | Polley et al. |
| 9,117,075 B1 | 8/2015 | Yeh |
| 9,130,836 B2 | 9/2015 | Kapadia et al. |
| 9,135,145 B2 | 9/2015 | Voccio et al. |
| 9,141,912 B2 | 9/2015 | Shircliff et al. |
| 9,141,914 B2 | 9/2015 | Viswanathan et al. |
| 9,146,820 B2 | 9/2015 | Alfadhly et al. |
| 9,152,789 B2 | 10/2015 | Natarajan et al. |
| 9,158,720 B2 | 10/2015 | Shirlen et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,179,058 B1 | 11/2015 | Zeira |
| 9,185,127 B2 | 11/2015 | Neou et al. |
| 9,191,042 B2 | 11/2015 | Dhayni |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,252,915 B1 | 2/2016 | Bakken |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,276,829 B2 | 3/2016 | Castro et al. |
| 9,281,940 B2 | 3/2016 | Matsuda et al. |
| 9,286,047 B1 | 3/2016 | Avramov et al. |
| 9,292,415 B2 | 3/2016 | Seto et al. |
| 9,294,486 B2 | 3/2016 | Chiang et al. |
| 9,294,498 B1 | 3/2016 | Yampolskiy et al. |
| 9,300,689 B2 | 3/2016 | Tsuchitoi |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,385,917 B1 | 7/2016 | Khanna et al. |
| 9,396,327 B2 | 7/2016 | Auger et al. |
| 9,397,902 B2 | 7/2016 | Dragon et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,483,334 B2 | 11/2016 | Walsh |
| 9,487,222 B2 | 11/2016 | Palmer et al. |
| 9,501,744 B1 | 11/2016 | Brisebois et al. |
| 9,531,589 B2 | 12/2016 | Clemm et al. |
| 9,536,084 B1 | 1/2017 | Lukacs et al. |
| 9,552,221 B1 | 1/2017 | Pora |
| 9,563,517 B1 | 2/2017 | Natanzon et al. |
| 9,575,869 B2 | 2/2017 | Pechanec et al. |
| 9,575,874 B2 | 2/2017 | Gautallin et al. |
| 9,576,240 B2 | 2/2017 | Jeong et al. |
| 9,582,669 B1 | 2/2017 | Shen et al. |
| 9,596,196 B1 | 3/2017 | Hills |
| 9,602,536 B1 | 3/2017 | Brown, Jr. et al. |
| 9,621,413 B1 | 4/2017 | Lee |
| 9,621,575 B1 | 4/2017 | Jalan et al. |
| 9,634,915 B2 | 4/2017 | Bley |
| 9,645,892 B1 | 5/2017 | Patwardhan |
| 9,658,942 B2 | 5/2017 | Bhat et al. |
| 9,665,474 B2 | 5/2017 | Li et al. |
| 9,678,803 B2 | 6/2017 | Suit |
| 9,684,453 B2 | 6/2017 | Holt et al. |
| 9,686,233 B2 | 6/2017 | Paxton |
| 9,697,033 B2 | 7/2017 | Koponen et al. |
| 9,727,394 B2 | 8/2017 | Kun et al. |
| 9,729,568 B2 | 8/2017 | Lefebvre et al. |
| 9,733,973 B2 | 8/2017 | Prasad et al. |
| 9,734,712 B1 * | 8/2017 | Lai .................. B61L 27/04 |
| 9,736,041 B2 | 8/2017 | Lumezanu et al. |
| 9,749,145 B2 | 8/2017 | Banavalikar et al. |
| 9,753,796 B2 * | 9/2017 | Mahaffey ............ G06F 11/0766 |
| 9,800,608 B2 | 10/2017 | Korsunsky et al. |
| 9,804,830 B2 | 10/2017 | Raman et al. |
| 9,804,951 B2 | 10/2017 | Liu et al. |
| 9,813,307 B2 | 11/2017 | Walsh et al. |
| 9,813,324 B2 | 11/2017 | Nampelly et al. |
| 9,813,516 B2 | 11/2017 | Wang |
| 9,825,911 B1 | 11/2017 | Brandwine |
| 9,836,183 B1 | 12/2017 | Love et al. |
| 9,857,825 B1 | 1/2018 | Johnson et al. |
| 9,858,621 B1 | 1/2018 | Konrardy et al. |
| 9,860,208 B1 | 1/2018 | Ettema et al. |
| 9,904,584 B2 | 2/2018 | Konig et al. |
| 9,916,232 B2 | 3/2018 | Voccio et al. |
| 9,916,538 B2 | 3/2018 | Zadeh et al. |
| 9,935,851 B2 | 4/2018 | Gandham et al. |
| 9,967,158 B2 | 5/2018 | Pang et al. |
| 9,979,615 B2 | 5/2018 | Kulshreshtha et al. |
| 9,996,529 B2 | 6/2018 | McCandless et al. |
| 10,002,187 B2 | 6/2018 | McCandless et al. |
| 10,009,240 B2 | 6/2018 | Rao et al. |
| 10,116,531 B2 | 10/2018 | Attar et al. |
| 10,142,353 B2 | 11/2018 | Yadav et al. |
| 10,171,319 B2 | 1/2019 | Yadav et al. |
| 10,243,862 B2 | 3/2019 | Cafarelli |
| 10,394,692 B2 | 8/2019 | Liu et al. |
| 10,447,551 B1 | 10/2019 | Zhang et al. |
| 10,454,793 B2 | 10/2019 | Deen et al. |
| 10,454,999 B2 | 10/2019 | Eder |
| 10,476,982 B2 | 11/2019 | Tarre et al. |
| 10,516,586 B2 | 12/2019 | Gandham et al. |
| 10,652,225 B2 | 5/2020 | Koved et al. |
| 10,686,804 B2 | 6/2020 | Yadav et al. |
| 10,749,890 B1 | 8/2020 | Aloisio et al. |
| 10,944,683 B1 | 3/2021 | Roskind |
| 11,368,378 B2 | 6/2022 | Gandham et al. |
| 11,516,098 B2 | 11/2022 | Spadaro et al. |
| 11,528,283 B2 | 12/2022 | Yadav et al. |
| 11,556,808 B1 | 1/2023 | Kim et al. |
| 2001/0028646 A1 | 10/2001 | Arts et al. |
| 2002/0023210 A1 | 2/2002 | Tuomenoksa et al. |
| 2002/0053033 A1 | 5/2002 | Cooper et al. |
| 2002/0083175 A1 | 6/2002 | Afek et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0107875 A1 | 8/2002 | Seliger et al. |
| 2002/0141343 A1 | 10/2002 | Bays |
| 2002/0184393 A1 | 12/2002 | Leddy et al. |
| 2002/0196292 A1 | 12/2002 | Itoh et al. |
| 2003/0005145 A1 | 1/2003 | Bullard |
| 2003/0016627 A1 | 1/2003 | MeLampy et al. |
| 2003/0023600 A1 | 1/2003 | Nagamura et al. |
| 2003/0023601 A1 | 1/2003 | Fortier, Jr. et al. |
| 2003/0046388 A1 | 3/2003 | Milliken |
| 2003/0065986 A1 | 4/2003 | Fraenkel et al. |
| 2003/0072269 A1 | 4/2003 | Teruhi et al. |
| 2003/0084158 A1 | 5/2003 | Saito et al. |
| 2003/0086425 A1 | 5/2003 | Bearden et al. |
| 2003/0097439 A1 | 5/2003 | Strayer et al. |
| 2003/0105976 A1 | 6/2003 | Copeland, III |
| 2003/0126242 A1 | 7/2003 | Chang |
| 2003/0133443 A1 | 7/2003 | Klinker et al. |
| 2003/0145232 A1 | 7/2003 | Poletto et al. |
| 2003/0149888 A1 | 8/2003 | Yadav |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2003/0206205 A1 | 11/2003 | Kawahara et al. |
| 2004/0019676 A1 | 1/2004 | Watsuki et al. |
| 2004/0030776 A1 | 2/2004 | Cantrell et al. |
| 2004/0036478 A1 | 2/2004 | Logvinov et al. |

(56) References Cited

U.S. PATENT DOCUMENTS

| | | |
|---|---|---|
| 2004/0046787 A1 | 3/2004 | Henry et al. |
| 2004/0049698 A1 | 3/2004 | Ott et al. |
| 2004/0054680 A1 | 3/2004 | Kelley et al. |
| 2004/0111679 A1 | 6/2004 | Subasic et al. |
| 2004/0133640 A1 | 7/2004 | Yeager et al. |
| 2004/0133690 A1 | 7/2004 | Chauffour et al. |
| 2004/0137908 A1 | 7/2004 | Sinivaara et al. |
| 2004/0167921 A1 | 8/2004 | Carson et al. |
| 2004/0205536 A1 | 10/2004 | Newman et al. |
| 2004/0213221 A1 | 10/2004 | Civanlar et al. |
| 2004/0218532 A1 | 11/2004 | Khirman |
| 2004/0220984 A1 | 11/2004 | Dudfield et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0060403 A1 | 3/2005 | Bernstein et al. |
| 2005/0063377 A1 | 3/2005 | Bryant et al. |
| 2005/0068907 A1 | 3/2005 | Garg et al. |
| 2005/0083933 A1 | 4/2005 | Fine et al. |
| 2005/0104885 A1 | 5/2005 | Jager et al. |
| 2005/0108331 A1 | 5/2005 | Osterman |
| 2005/0122325 A1 | 6/2005 | Twait |
| 2005/0138157 A1 | 6/2005 | Jung et al. |
| 2005/0154625 A1 | 7/2005 | Chua et al. |
| 2005/0166066 A1 | 7/2005 | Ahuja et al. |
| 2005/0177829 A1 | 8/2005 | Vishwanath |
| 2005/0177871 A1 | 8/2005 | Roesch et al. |
| 2005/0182681 A1 | 8/2005 | Bruskotter et al. |
| 2005/0185621 A1 | 8/2005 | Sivakumar et al. |
| 2005/0198247 A1 | 9/2005 | Perry et al. |
| 2005/0198371 A1 | 9/2005 | Smith et al. |
| 2005/0198629 A1 | 9/2005 | Mshwanath |
| 2005/0207376 A1 | 9/2005 | Ashwood-Smith et al. |
| 2005/0210331 A1 | 9/2005 | Connelly et al. |
| 2005/0210533 A1 | 9/2005 | Copeland et al. |
| 2005/0228885 A1 | 10/2005 | Winfield et al. |
| 2005/0237948 A1 | 10/2005 | Wan |
| 2005/0257244 A1 | 11/2005 | Joly et al. |
| 2005/0289244 A1 | 12/2005 | Sahu et al. |
| 2006/0004758 A1 | 1/2006 | Teng et al. |
| 2006/0026669 A1 | 2/2006 | Zakas |
| 2006/0048218 A1 | 3/2006 | Lingafelt et al. |
| 2006/0058218 A1 | 3/2006 | Syud et al. |
| 2006/0075396 A1 | 4/2006 | Surasinghe |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0098625 A1 | 5/2006 | King et al. |
| 2006/0101516 A1 | 5/2006 | Sudaharan et al. |
| 2006/0106550 A1 | 5/2006 | Morin et al. |
| 2006/0143432 A1 | 6/2006 | Rothman et al. |
| 2006/0156408 A1 | 7/2006 | Himberger et al. |
| 2006/0158266 A1 | 7/2006 | Yonekawa et al. |
| 2006/0158354 A1 | 7/2006 | Aberg et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0212556 A1 | 9/2006 | Yacoby et al. |
| 2006/0224398 A1 | 10/2006 | Lakshman et al. |
| 2006/0253566 A1 | 11/2006 | Stassinopoulos et al. |
| 2006/0265713 A1 | 11/2006 | Depro et al. |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0010898 A1 | 1/2007 | Hosek et al. |
| 2007/0014275 A1 | 1/2007 | Bettink et al. |
| 2007/0019618 A1 | 1/2007 | Shaffer et al. |
| 2007/0025306 A1 | 2/2007 | Cox et al. |
| 2007/0044147 A1 | 2/2007 | Choi et al. |
| 2007/0067756 A1 | 3/2007 | Garza |
| 2007/0074288 A1 | 3/2007 | Chang et al. |
| 2007/0097976 A1 | 5/2007 | Wood et al. |
| 2007/0118654 A1 | 5/2007 | Jamkhedkar et al. |
| 2007/0124376 A1 | 5/2007 | Greenwell |
| 2007/0127491 A1 | 6/2007 | Verzijp et al. |
| 2007/0140131 A1 | 6/2007 | Malloy et al. |
| 2007/0150568 A1 | 6/2007 | Ruiz |
| 2007/0162420 A1 | 7/2007 | Ou et al. |
| 2007/0169179 A1 | 7/2007 | Narad |
| 2007/0177626 A1 | 8/2007 | Kotelba |
| 2007/0180526 A1 | 8/2007 | Copeland, III |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0199060 A1 | 8/2007 | Touboul |
| 2007/0201474 A1 | 8/2007 | Isobe |
| 2007/0211637 A1 | 9/2007 | Mitchell |
| 2007/0214348 A1 | 9/2007 | Danielsen |
| 2007/0223388 A1 | 9/2007 | Arad et al. |
| 2007/0230415 A1 | 10/2007 | Malik |
| 2007/0232265 A1 | 10/2007 | Park et al. |
| 2007/0250640 A1 | 10/2007 | Wells |
| 2007/0250930 A1 | 10/2007 | Aziz et al. |
| 2007/0280108 A1 | 12/2007 | Sakurai |
| 2007/0300061 A1 | 12/2007 | Kim et al. |
| 2008/0002697 A1 | 1/2008 | Anantharamaiah et al. |
| 2008/0013532 A1 | 1/2008 | Garner et al. |
| 2008/0017619 A1 | 1/2008 | Yamakawa et al. |
| 2008/0022385 A1 | 1/2008 | Crowell et al. |
| 2008/0028389 A1 | 1/2008 | Genty et al. |
| 2008/0040088 A1 | 2/2008 | Vankov et al. |
| 2008/0046708 A1 | 2/2008 | Fitzgerald et al. |
| 2008/0049633 A1 | 2/2008 | Edwards et al. |
| 2008/0052387 A1 | 2/2008 | Heinz et al. |
| 2008/0056124 A1 | 3/2008 | Nanda et al. |
| 2008/0066009 A1 | 3/2008 | Gardner et al. |
| 2008/0082662 A1 | 4/2008 | Dandliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0181100 A1 | 7/2008 | Yang et al. |
| 2008/0185621 A1 | 8/2008 | Yi et al. |
| 2008/0201109 A1 | 8/2008 | Zill et al. |
| 2008/0208367 A1 | 8/2008 | Koehler et al. |
| 2008/0222352 A1 | 9/2008 | Booth et al. |
| 2008/0232358 A1 | 9/2008 | Baker et al. |
| 2008/0247539 A1 | 10/2008 | Huang et al. |
| 2008/0250122 A1 | 10/2008 | Zsigmond et al. |
| 2008/0250128 A1 | 10/2008 | Sargent |
| 2008/0262990 A1 | 10/2008 | Kapoor et al. |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0298271 A1 | 12/2008 | Morinaga et al. |
| 2008/0301755 A1 | 12/2008 | Sinha et al. |
| 2008/0301765 A1 | 12/2008 | Nicol et al. |
| 2008/0320592 A1 | 12/2008 | Suit et al. |
| 2009/0019026 A1 | 1/2009 | Valdes-Perez et al. |
| 2009/0059934 A1 | 3/2009 | Aggarwal et al. |
| 2009/0064332 A1 | 3/2009 | Porras et al. |
| 2009/0077097 A1 | 3/2009 | Lacapra et al. |
| 2009/0077543 A1 | 3/2009 | Siskind et al. |
| 2009/0077666 A1 | 3/2009 | Chen et al. |
| 2009/0106646 A1 | 4/2009 | Mollicone et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0158432 A1 | 6/2009 | Zheng et al. |
| 2009/0177484 A1 | 7/2009 | Davis et al. |
| 2009/0180393 A1 | 7/2009 | Nakamura |
| 2009/0192847 A1 | 7/2009 | Lipkin et al. |
| 2009/0193495 A1 | 7/2009 | McAfee et al. |
| 2009/0241170 A1 | 9/2009 | Kumar et al. |
| 2009/0249302 A1 | 10/2009 | Xu et al. |
| 2009/0252181 A1 | 10/2009 | Desanti |
| 2009/0260083 A1 | 10/2009 | Szeto et al. |
| 2009/0271412 A1 | 10/2009 | Lacapra |
| 2009/0292795 A1 | 11/2009 | Ford et al. |

(56) References Cited

U.S. PATENT DOCUMENTS

| | | |
|---|---|---|
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0310485 A1 | 12/2009 | Averi et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0005478 A1 | 1/2010 | Helfman et al. |
| 2010/0042716 A1 | 2/2010 | Farajidana et al. |
| 2010/0049839 A1 | 2/2010 | Parker et al. |
| 2010/0054241 A1 | 3/2010 | Shah et al. |
| 2010/0070647 A1 | 3/2010 | Irino et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0157809 A1 | 6/2010 | Duffield et al. |
| 2010/0161817 A1 | 6/2010 | Xiao |
| 2010/0174813 A1 | 7/2010 | Hildreth et al. |
| 2010/0180016 A1 | 7/2010 | Bugwadia et al. |
| 2010/0188989 A1 | 7/2010 | Wing et al. |
| 2010/0188995 A1 | 7/2010 | Raleigh |
| 2010/0194741 A1 | 8/2010 | Finocchio |
| 2010/0220584 A1 | 9/2010 | DeHaan et al. |
| 2010/0226373 A1 | 9/2010 | Rowell et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0246432 A1 | 9/2010 | Zhang et al. |
| 2010/0287266 A1 | 11/2010 | Asati et al. |
| 2010/0303240 A1 | 12/2010 | Beachem et al. |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055382 A1 | 3/2011 | Narasimhan |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083124 A1 | 4/2011 | Moskal et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0125894 A1 | 5/2011 | Anderson et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0158112 A1 | 6/2011 | Finn et al. |
| 2011/0158410 A1 | 6/2011 | Falk |
| 2011/0167435 A1 | 7/2011 | Fang |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0191465 A1 | 8/2011 | Hofstaedter et al. |
| 2011/0196957 A1 | 8/2011 | Ayachitula et al. |
| 2011/0202655 A1 | 8/2011 | Sharma et al. |
| 2011/0202761 A1 | 8/2011 | Sarela et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0231510 A1 | 9/2011 | Korsunsky et al. |
| 2011/0238793 A1 | 9/2011 | Bedare et al. |
| 2011/0239194 A1 | 9/2011 | Braude |
| 2011/0246663 A1 | 10/2011 | Melsen et al. |
| 2011/0267952 A1 | 11/2011 | Ko et al. |
| 2011/0276951 A1 | 11/2011 | Jain |
| 2011/0277034 A1 | 11/2011 | Hanson |
| 2011/0283266 A1 | 11/2011 | Gallagher et al. |
| 2011/0283277 A1 | 11/2011 | Castillo et al. |
| 2011/0289122 A1 | 11/2011 | Grube et al. |
| 2011/0289301 A1 | 11/2011 | Allen et al. |
| 2011/0302295 A1 | 12/2011 | Westerfeld et al. |
| 2011/0302652 A1 | 12/2011 | Westerfeld |
| 2011/0310892 A1 | 12/2011 | DiMambro |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0011153 A1 | 1/2012 | Buchanan et al. |
| 2012/0017262 A1 | 1/2012 | Kapoor et al. |
| 2012/0047394 A1 | 2/2012 | Jain et al. |
| 2012/0075999 A1 | 3/2012 | Ko et al. |
| 2012/0079592 A1 | 3/2012 | Pandrangi |
| 2012/0089664 A1 | 4/2012 | Igelka |
| 2012/0096394 A1 | 4/2012 | Balko et al. |
| 2012/0102361 A1 | 4/2012 | Sass et al. |
| 2012/0102543 A1 | 4/2012 | Kohli et al. |
| 2012/0102545 A1 | 4/2012 | Carter, III et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0144030 A1 | 6/2012 | Narasimhan |
| 2012/0167057 A1 | 6/2012 | Schmich et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0216282 A1 | 8/2012 | Pappu et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240185 A1 | 9/2012 | Kapoor et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0255875 A1 | 10/2012 | Mcente et al. |
| 2012/0260135 A1 | 10/2012 | Beck et al. |
| 2012/0260227 A1 | 10/2012 | Shukla et al. |
| 2012/0268405 A1 | 10/2012 | Ferren et al. |
| 2012/0278021 A1 | 11/2012 | Lin et al. |
| 2012/0281700 A1 | 11/2012 | Koganti et al. |
| 2012/0287815 A1 | 11/2012 | Attar |
| 2012/0300628 A1 | 11/2012 | Prescott et al. |
| 2013/0003538 A1 | 1/2013 | Greenberg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0019008 A1 | 1/2013 | Jorgenson et al. |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0055145 A1 | 2/2013 | Antony et al. |
| 2013/0055373 A1 | 2/2013 | Beacham et al. |
| 2013/0064096 A1 | 3/2013 | Degioanni et al. |
| 2013/0080375 A1 | 3/2013 | Mswanathan et al. |
| 2013/0085889 A1 | 4/2013 | Fitting et al. |
| 2013/0086272 A1 | 4/2013 | Chen et al. |
| 2013/0094372 A1 | 4/2013 | Boot |
| 2013/0097706 A1 | 4/2013 | Titonis et al. |
| 2013/0103827 A1 | 4/2013 | Dunlap et al. |
| 2013/0107709 A1 | 5/2013 | Campbell et al. |
| 2013/0114598 A1 | 5/2013 | Schrum et al. |
| 2013/0117748 A1 | 5/2013 | Cooper et al. |

(56) References Cited

U.S. PATENT DOCUMENTS

| | | |
|---|---|---|
| 2013/0122854 A1 | 5/2013 | Agarwal et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0160128 A1 | 6/2013 | Dolan-Gavitt et al. |
| 2013/0166730 A1 | 6/2013 | Wilkinson |
| 2013/0173784 A1 | 7/2013 | Wang et al. |
| 2013/0173787 A1 | 7/2013 | Tateishi et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198509 A1 | 8/2013 | Buruganahalli et al. |
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205137 A1 | 8/2013 | Farrugia et al. |
| 2013/0205293 A1 | 8/2013 | Levijarvi et al. |
| 2013/0217332 A1* | 8/2013 | Altman ............ G06Q 20/3224 455/3.01 |
| 2013/0219161 A1 | 8/2013 | Fontignie et al. |
| 2013/0219263 A1 | 8/2013 | Abrahami |
| 2013/0219500 A1 | 8/2013 | Lukas et al. |
| 2013/0232498 A1 | 9/2013 | Mangtani et al. |
| 2013/0238665 A1 | 9/2013 | Sequin |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |
| 2013/0275579 A1 | 10/2013 | Hernandez et al. |
| 2013/0283240 A1 | 10/2013 | Krajec et al. |
| 2013/0283281 A1 | 10/2013 | Krajec et al. |
| 2013/0283374 A1 | 10/2013 | Zisapel et al. |
| 2013/0290521 A1 | 10/2013 | Labovitz et al. |
| 2013/0297771 A1 | 11/2013 | Osterloh et al. |
| 2013/0298244 A1 | 11/2013 | Kumar et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0308468 A1 | 11/2013 | Cowie |
| 2013/0312097 A1 | 11/2013 | Turnbull |
| 2013/0318357 A1 | 11/2013 | Abraham et al. |
| 2013/0322441 A1 | 12/2013 | Anumala |
| 2013/0326623 A1 | 12/2013 | Kruglick |
| 2013/0326625 A1 | 12/2013 | Anderson et al. |
| 2013/0332773 A1 | 12/2013 | Yuan et al. |
| 2013/0333029 A1 | 12/2013 | Chesla et al. |
| 2013/0335219 A1 | 12/2013 | Malkowski |
| 2013/0336164 A1 | 12/2013 | Yang et al. |
| 2013/0343207 A1 | 12/2013 | Cook et al. |
| 2013/0346054 A1 | 12/2013 | Mumtaz |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0009338 A1 | 1/2014 | Lin et al. |
| 2014/0012562 A1 | 1/2014 | Chang et al. |
| 2014/0012814 A1 | 1/2014 | Bercovici et al. |
| 2014/0019972 A1 | 1/2014 | Yahalom et al. |
| 2014/0020099 A1 | 1/2014 | Vaidyanathan et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047274 A1 | 2/2014 | Lumezanu et al. |
| 2014/0047372 A1 | 2/2014 | Gnezdov et al. |
| 2014/0050222 A1 | 2/2014 | Lynar et al. |
| 2014/0053226 A1 | 2/2014 | Fadida et al. |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |
| 2014/0075048 A1 | 3/2014 | Yuksel et al. |
| 2014/0075336 A1 | 3/2014 | Curtis et al. |
| 2014/0081596 A1 | 3/2014 | Agrawal et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0108665 A1 | 4/2014 | Arora et al. |
| 2014/0115219 A1 | 4/2014 | Ajanovic et al. |
| 2014/0115403 A1 | 4/2014 | Rhee et al. |
| 2014/0115654 A1 | 4/2014 | Rogers et al. |
| 2014/0122656 A1 | 5/2014 | Baldwin et al. |
| 2014/0129942 A1 | 5/2014 | Rathod |
| 2014/0136680 A1 | 5/2014 | Joshi et al. |
| 2014/0137109 A1 | 5/2014 | Sharma et al. |
| 2014/0137180 A1 | 5/2014 | Lukacs et al. |
| 2014/0140213 A1 | 5/2014 | Raleigh et al. |
| 2014/0140244 A1 | 5/2014 | Kapadia et al. |
| 2014/0141524 A1 | 5/2014 | Keith |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0173723 A1 | 6/2014 | Singla et al. |
| 2014/0192639 A1 | 7/2014 | Smirnov |
| 2014/0201717 A1 | 7/2014 | Mascaro et al. |
| 2014/0201838 A1 | 7/2014 | Varsanyi et al. |
| 2014/0208296 A1 | 7/2014 | Dang et al. |
| 2014/0210616 A1 | 7/2014 | Ramachandran |
| 2014/0215443 A1 | 7/2014 | Voccio et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0230062 A1 | 8/2014 | Kumaran |
| 2014/0233387 A1 | 8/2014 | Zheng et al. |
| 2014/0247206 A1 | 9/2014 | Grokop et al. |
| 2014/0258310 A1 | 9/2014 | Wong et al. |
| 2014/0269777 A1 | 9/2014 | Rothstein et al. |
| 2014/0280499 A1 | 9/2014 | Basavaiah et al. |
| 2014/0280892 A1 | 9/2014 | Reynolds et al. |
| 2014/0280908 A1 | 9/2014 | Rothstein et al. |
| 2014/0281030 A1 | 9/2014 | Cui et al. |
| 2014/0286174 A1 | 9/2014 | Izuka et al. |
| 2014/0286354 A1 | 9/2014 | Van De Poel et al. |
| 2014/0289418 A1 | 9/2014 | Cohen et al. |
| 2014/0289854 A1 | 9/2014 | Mahvi |
| 2014/0297357 A1 | 10/2014 | Zeng et al. |
| 2014/0298461 A1 | 10/2014 | Hohndel et al. |
| 2014/0301213 A1 | 10/2014 | Khanal et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0321290 A1 | 10/2014 | Jin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0344438 A1 | 11/2014 | Chen et al. |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2014/0376379 A1 | 12/2014 | Fredette et al. |
| 2015/0006689 A1 | 1/2015 | Szilagyi et al. |
| 2015/0006714 A1 | 1/2015 | Jain |
| 2015/0007317 A1 | 1/2015 | Jain |
| 2015/0009840 A1 | 1/2015 | Pruthi et al. |
| 2015/0019140 A1 | 1/2015 | Downey et al. |
| 2015/0019569 A1 | 1/2015 | Parker et al. |
| 2015/0023170 A1 | 1/2015 | Kakadia et al. |
| 2015/0026794 A1 | 1/2015 | Zuk et al. |
| 2015/0026809 A1 | 1/2015 | Altman et al. |
| 2015/0033305 A1 | 1/2015 | Shear et al. |
| 2015/0036480 A1 | 2/2015 | Huang et al. |

(56) References Cited

U.S. PATENT DOCUMENTS

| | | |
|---|---|---|
| 2015/0036533 A1 | 2/2015 | Sodhi et al. |
| 2015/0039751 A1 | 2/2015 | Harrigan et al. |
| 2015/0039757 A1 | 2/2015 | Petersen et al. |
| 2015/0043351 A1 | 2/2015 | Ohkawa et al. |
| 2015/0046882 A1 | 2/2015 | Menyhart et al. |
| 2015/0047032 A1 | 2/2015 | Hannis et al. |
| 2015/0052441 A1 | 2/2015 | Degioanni |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0089614 A1 | 3/2015 | Mathew et al. |
| 2015/0095332 A1 | 4/2015 | Beisiegel et al. |
| 2015/0099956 A1* | 4/2015 | Emken .......... H04L 67/125 600/365 |
| 2015/0112933 A1 | 4/2015 | Satapathy |
| 2015/0113063 A1 | 4/2015 | Liu et al. |
| 2015/0113133 A1 | 4/2015 | Srinivas et al. |
| 2015/0117624 A1 | 4/2015 | Rosenshine |
| 2015/0124608 A1 | 5/2015 | Agarwal et al. |
| 2015/0124652 A1 | 5/2015 | Dharmapurikar et al. |
| 2015/0128133 A1 | 5/2015 | Pohlmann |
| 2015/0128205 A1 | 5/2015 | Mahaffey et al. |
| 2015/0128246 A1 | 5/2015 | Feghali et al. |
| 2015/0134801 A1 | 5/2015 | Walley et al. |
| 2015/0138993 A1 | 5/2015 | Forster et al. |
| 2015/0142962 A1 | 5/2015 | Srinivas et al. |
| 2015/0147973 A1 | 5/2015 | Williams et al. |
| 2015/0156118 A1 | 6/2015 | Madani et al. |
| 2015/0170213 A1 | 6/2015 | O'Malley |
| 2015/0195291 A1 | 7/2015 | Zuk et al. |
| 2015/0199254 A1 | 7/2015 | Vesepogu et al. |
| 2015/0222516 A1 | 8/2015 | Deval et al. |
| 2015/0222939 A1 | 8/2015 | Gallant et al. |
| 2015/0227396 A1 | 8/2015 | Nimmagadda et al. |
| 2015/0227598 A1 | 8/2015 | Hahn et al. |
| 2015/0244617 A1 | 8/2015 | Nakil et al. |
| 2015/0244739 A1 | 8/2015 | Ben-Shalom et al. |
| 2015/0249622 A1 | 9/2015 | Phillips et al. |
| 2015/0254330 A1 | 9/2015 | Chan et al. |
| 2015/0256413 A1 | 9/2015 | Du et al. |
| 2015/0256555 A1 | 9/2015 | Choi et al. |
| 2015/0256587 A1 | 9/2015 | Walker et al. |
| 2015/0261842 A1 | 9/2015 | Huang et al. |
| 2015/0261886 A1 | 9/2015 | Wu et al. |
| 2015/0261887 A1 | 9/2015 | Joukov |
| 2015/0271008 A1 | 9/2015 | Jain et al. |
| 2015/0271255 A1 | 9/2015 | Mackay et al. |
| 2015/0278273 A1 | 10/2015 | Wigington et al. |
| 2015/0281116 A1 | 10/2015 | Ko et al. |
| 2015/0281277 A1 | 10/2015 | May et al. |
| 2015/0281407 A1 | 10/2015 | Raju et al. |
| 2015/0294212 A1 | 10/2015 | Fein |
| 2015/0295945 A1 | 10/2015 | Canzanese, Jr. et al. |
| 2015/0304346 A1 | 10/2015 | Kim |
| 2015/0312233 A1 | 10/2015 | Graham, III et al. |
| 2015/0336016 A1 | 11/2015 | Chaturvedi |
| 2015/0341376 A1 | 11/2015 | Nandy et al. |
| 2015/0341379 A1 | 11/2015 | Lefebvre et al. |
| 2015/0341383 A1 | 11/2015 | Reddy et al. |
| 2015/0347554 A1 | 12/2015 | Vasantham et al. |
| 2015/0356297 A1 | 12/2015 | Guri et al. |
| 2015/0358287 A1 | 12/2015 | Caputo, II et al. |
| 2015/0358352 A1 | 12/2015 | Chasin et al. |
| 2015/0379278 A1 | 12/2015 | Thota et al. |
| 2015/0381409 A1 | 12/2015 | Margalit et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0028605 A1 | 1/2016 | Gil et al. |
| 2016/0030683 A1 | 2/2016 | Taylor et al. |
| 2016/0034560 A1 | 2/2016 | Setayesh et al. |
| 2016/0035787 A1 | 2/2016 | Matsuda |
| 2016/0036636 A1 | 2/2016 | Erickson et al. |
| 2016/0036833 A1 | 2/2016 | Ardeli et al. |
| 2016/0036837 A1 | 2/2016 | Jain et al. |
| 2016/0036838 A1 | 2/2016 | Jain et al. |
| 2016/0050128 A1 | 2/2016 | Schaible et al. |
| 2016/0050132 A1 | 2/2016 | Zhang |
| 2016/0072638 A1 | 3/2016 | Amer et al. |
| 2016/0072815 A1 | 3/2016 | Rieke et al. |
| 2016/0080414 A1 | 3/2016 | Kolton et al. |
| 2016/0087861 A1 | 3/2016 | Kuan et al. |
| 2016/0094394 A1 | 3/2016 | Sharma et al. |
| 2016/0094529 A1 | 3/2016 | Mityagin |
| 2016/0094994 A1 | 3/2016 | Kirkby et al. |
| 2016/0103692 A1 | 4/2016 | Guntaka et al. |
| 2016/0105333 A1 | 4/2016 | Lenglet et al. |
| 2016/0105350 A1 | 4/2016 | Greifeneder et al. |
| 2016/0112269 A1 | 4/2016 | Singh et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0148251 A1 | 5/2016 | Thomas et al. |
| 2016/0150060 A1 | 5/2016 | Meng et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191362 A1 | 6/2016 | Hwang et al. |
| 2016/0191466 A1 | 6/2016 | Pernicha |
| 2016/0191469 A1 | 6/2016 | Zatko et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0218933 A1 | 7/2016 | Porras et al. |
| 2016/0234083 A1 | 8/2016 | Ahn et al. |
| 2016/0248794 A1 | 8/2016 | Cam |
| 2016/0255082 A1 | 9/2016 | Rathod |
| 2016/0269424 A1 | 9/2016 | Chandola et al. |
| 2016/0269442 A1 | 9/2016 | Shieh |
| 2016/0269482 A1 | 9/2016 | Jamjoom et al. |
| 2016/0277272 A1 | 9/2016 | Peach et al. |
| 2016/0277435 A1 | 9/2016 | Salajegheh et al. |
| 2016/0283307 A1 | 9/2016 | Takeshima et al. |
| 2016/0285730 A1 | 9/2016 | Ohkawa et al. |
| 2016/0292065 A1 | 10/2016 | Thangamani et al. |
| 2016/0294691 A1 | 10/2016 | Joshi |
| 2016/0306550 A1 | 10/2016 | Liu et al. |
| 2016/0308908 A1 | 10/2016 | Kirby et al. |
| 2016/0321452 A1 | 11/2016 | Richardson |
| 2016/0321455 A1 | 11/2016 | Deng et al. |
| 2016/0330097 A1 | 11/2016 | Kim et al. |
| 2016/0337204 A1 | 11/2016 | Dubey et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parandehgheibi et al. |
| 2016/0359680 A1 | 12/2016 | Parandehgheibi et al. |
| 2016/0359686 A1 | 12/2016 | Parandehgheibi et al. |
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |

(56) References Cited

U.S. PATENT DOCUMENTS

| | | |
|---|---|---|
| 2016/0359705 A1 | 12/2016 | Parandehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parandehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0380865 A1 | 12/2016 | Dubal et al. |
| 2016/0380869 A1 | 12/2016 | Shen et al. |
| 2017/0006141 A1 | 1/2017 | Bhadra |
| 2017/0024453 A1 | 1/2017 | Raja et al. |
| 2017/0032122 A1 | 2/2017 | Thakar et al. |
| 2017/0032310 A1 | 2/2017 | Mimnaugh |
| 2017/0034018 A1 | 2/2017 | Parandehgheibi et al. |
| 2017/0048121 A1 | 2/2017 | Hobbs et al. |
| 2017/0054643 A1 | 2/2017 | Fraser |
| 2017/0059353 A1 | 3/2017 | Madine et al. |
| 2017/0070582 A1 | 3/2017 | Desai et al. |
| 2017/0075710 A1 | 3/2017 | Prasad et al. |
| 2017/0085483 A1 | 3/2017 | Mihaly et al. |
| 2017/0091204 A1 | 3/2017 | Minwalla et al. |
| 2017/0093910 A1 | 3/2017 | Gukal et al. |
| 2017/0118244 A1 | 4/2017 | Bai et al. |
| 2017/0163502 A1 | 6/2017 | MacNeil et al. |
| 2017/0187733 A1 | 6/2017 | Ahn et al. |
| 2017/0201448 A1 | 7/2017 | Deval et al. |
| 2017/0208487 A1 | 7/2017 | Ratakonda et al. |
| 2017/0214708 A1 | 7/2017 | Gukal et al. |
| 2017/0222909 A1 | 8/2017 | Sadana et al. |
| 2017/0223052 A1 | 8/2017 | Stutz |
| 2017/0250880 A1 | 8/2017 | Akens et al. |
| 2017/0250951 A1 | 8/2017 | Wang et al. |
| 2017/0257424 A1 | 9/2017 | Neogi et al. |
| 2017/0284839 A1 | 10/2017 | Ojala |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0324518 A1 | 11/2017 | Meng et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0005427 A1 | 1/2018 | Marvie et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0032905 A1 | 2/2018 | Abercrombie |
| 2018/0098123 A1 | 4/2018 | Larson et al. |
| 2018/0145906 A1 | 5/2018 | Yadav et al. |
| 2018/0191617 A1 | 7/2018 | Caulfield et al. |
| 2020/0225110 A1 | 7/2020 | Knauss et al. |
| 2020/0273040 A1 | 8/2020 | Novick et al. |
| 2020/0279055 A1 | 9/2020 | Nambiar et al. |
| 2020/0396129 A1 | 12/2020 | Tedaldi et al. |
| 2022/0141103 A1 | 5/2022 | Gandham et al. |

FOREIGN PATENT DOCUMENTS

| | | | |
|---|---|---|---|
| CN | 101093452 A | 12/2007 | |
| CN | 101465763 A | 6/2009 | |
| CN | 101667935 A | 3/2010 | |
| CN | 101770551 A | 7/2010 | |
| CN | 102142009 A | 8/2011 | |
| CN | 102204170 A | 9/2011 | |
| CN | 102521537 A | 6/2012 | |
| CN | 103023970 A | 4/2013 | |
| CN | 103699664 | 4/2014 | |
| CN | 103716137 A | 4/2014 | |
| CN | 104065518 A | 9/2014 | |
| CN | 107196807 A | 9/2017 | |
| EP | 0811942 A2 | 12/1997 | |
| EP | 1039690 A2 | 9/2000 | |
| EP | 1069741 A1 | 1/2001 | |
| EP | 1076848 B1 | 7/2002 | |
| EP | 1383261 A1 | 1/2004 | |
| EP | 1450511 A1 | 8/2004 | |
| EP | 2043320 A1 | 4/2009 | |
| EP | 2045974 A1 | 4/2009 | |
| EP | 2427022 A1 | 3/2012 | |
| EP | 2723034 A1 | 4/2014 | |
| EP | 2860912 A1 | 4/2015 | |
| EP | 2887595 A1 | 6/2015 | |
| EP | 3069241 B1 | 8/2018 | |
| EP | 3793166 A1 | 3/2021 | |
| JP | 2009016906 A | 1/2009 | |
| JP | 4460763 B2 * | 5/2010 | ......... G06K 9/00006 |
| KR | 101394338 B1 | 5/2014 | |
| WO | 0145370 A1 | 6/2001 | |
| WO | 2006045793 A1 | 5/2006 | |
| WO | 2007014314 A2 | 2/2007 | |
| WO | 2007042171 A1 | 4/2007 | |
| WO | 2007070711 A2 | 6/2007 | |
| WO | 2008069439 A1 | 6/2008 | |
| WO | 2010048693 A1 | 5/2010 | |
| WO | 2010059972 A2 | 5/2010 | |
| WO | 2012139288 A1 | 10/2012 | |
| WO | 2013030830 A1 | 3/2013 | |
| WO | 2013126759 | 8/2013 | |
| WO | 2014127008 A1 | 8/2014 | |
| WO | 2015042171 A1 | 3/2015 | |
| WO | 2015099778 A1 | 7/2015 | |
| WO | 2015118454 A1 | 8/2015 | |
| WO | 2016004075 A1 | 1/2016 | |
| WO | 2016019523 A1 | 2/2016 | |

OTHER PUBLICATIONS

Matteson R., "Depmap: Dependency Mapping of Applications Using Operating System Events," A Thesis, Master's Thesis, California Polytechnic State University, Dec. 2010, 115 pages.

Merriam-Webster, "Definition of Database," Merriam-Webster Dictionary, 2018, 4 Pages.

Miller N., et al., "Collecting Network Status Information for Network-Aware Applications," International Conference on Computer Communications IEEE (INFOCOM), 2000, pp. 1-10.

Moe J., et al., "Understanding Distributed Systems Via Execution Trace Data," Proceedings of the 9th International Workshop on Program Comprehension, Toronto, Canada, May 12-13, 2001, 8 Pages.

Nagarajan R., et al., "Approximation Techniques for Computing Packet Loss in Finite-buffered Voice Multiplexers," IEEE Journal on Selected Areas in Communications, Apr. 1991, vol. 9, No. 3, pp. 368-377.

Natarajan A., et al., "NSDMiner: Automated Discovery of Network Service Dependencies," Proceedings IEEE INFOCOM, Orlando, FL, 2012, 9 Pages.

Navaz A.S.S., et al., "Entropy Based Anomaly Detection System to Prevent DDOS Attacks in Cloud," International Journal of Computer Applications (0975-8887), Jan. 2013, vol. 62, No. 15, pp. 42-47.

Neverfail, "Neverfail IT Continuity Architect," 2015, 6 Pages, Retrieved on [Apr. 22, 2016], Retrieved from the Internet: URL:

(56) References Cited

OTHER PUBLICATIONS https://web.archive.org/web/20150908090456/ http://www.neverfallgroup.com/products/it-continuity-architect.
Nilsson D.K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Notification Concerning Transmittal of Copy of International Preliminary Report on Patentability for International Application No. PCT/US2016/035348, mailed Dec. 14, 2017, 7 pages.
Notification Concerning Transmittal of Copy of International Preliminary Report on Patentability for International Application No. PCT/US2016/035349, mailed Dec. 14, 2017, 7 pages.
Notification Concerning Transmittal of Copy of International Preliminary Report on Patentability for International Application No. PCT/US2016/035350, mailed Dec. 14, 2017, 11 pages.
Notification Concerning Transmittal of Copy of International Preliminary Report on Patentability for International Application No. PCT/US2016/035351, mailed Dec. 14, 2017, 11 pages.
Nunnally T., et al., "P3D: A Parallel 3D Coordinate Visualization for Advanced Network Scans," IEEE International Conference on Communications (ICC), Jun. 9-13, 2013, pp. 1-6, Retrieved from the Internet: URL: www2.ece.gatech.edu.
O'Donnell G., et al., "The CMDB Imperative: How to Realize the Dream and Avoid the Nightmares," Chapter 4, The Federated CMS Architecture, Prentice Hall, Feb. 19, 2009, 44 pages.
Ohta K., et al., "Detection, Defense, and Tracking of Internet-Wide Illegal Access in a Distributed Manner," 2000, 16 bages, [Retrieved on May 9, 2016], Retrieved from Internet: URL: https://www.isoc.org/inet2000/cdproceedings/1f/1f_2.htm.
Online Collins English Dictionary: "Precede Definition and Meaning," 1 Page, [Retrieved on Apr. 9, 2018].
Opentracing IO, "The OpenTracing Semantic Specification," 8 pages, Retrieved on Jul. 5, 2023, from URL: https://opentracing.io/docs/.
Pathway Systems International Inc., "How Blueprints does Integration," Apr. 15, 2014, 9 Pages, [Retrieved on Apr. 27, 2016], Retrieved from the Internet: URL: http://pathwaysystems.com/company-blog/.
Pathway Systems International Inc., "What is Blueprints?," 2010-2016, 1 Page, [Retrieved on Apr. 27, 2016], Retrieved from the Internet: URL: http:/pathwavsystems.com/blueprints-about/.
Popa L., et al., "Macroscope: End-Point Approach to Networked Application Dependency Discovery," CoNEXT'09, Dec. 1-4, 2009, Rome, Italy, 12 pages.
Prasad K.M., et al., "An Efficient Detection of Flooding Attacks to Internet Threat Monitors (ITM) using Entropy Variations under Low Traffic," Computing Communication Networking Technologies (ICCCNT 12), Jul. 26-28, 2012, 11 Pages.
Sachan M., et al., "Solving Electrical Networks to Incorporate Supervision in Random Walks," In Proceedings of the 22nd International Conference on World Wide Web Companion (WWW '13 Companion), International World Wide Web Conferences Steering Committee, Republic and Canton of Geneva, Switzerland, May 13-17, 2013, pp. 109-110.
Sammarco M., et al., "Trace Selection for Improved WLAN Monitoring," In Proceedings of the 5th ACM Workshop on HotPlanet (HotPlanet '13), ACM, New York, NY, USA, Aug. 16, 2013, pp. 9-14.
Sandholm T., et al., "MapReduce Optimization Using Regulated Dynamic Prioritization," ACM, Jun. 15-19, 2009, pp. 299-310.
Sardella A., "Securing Service Provider Networks: Protecting Infrastructure and Managing Customer Security," Juniper Networks, Inc., White Paper, Dec. 2006, pp. 1-19.
Senel F., et al., "Optimized Interconnection of Disjoint Wireless Sensor Network Segments Using K Mobile Data Collectors," IEEE International Conference on Communications (ICC), Jun. 2012, pp. 497-501.
Sherri S., et al., "A Chipset Level Network Backdoor: Bypassing Host-Based Firewall IDS," ACM 2009, pp. 125-134.
Shneiderman B., "Network Visualization by Semantic Substrates," Visualization and Computer Graphics, IEEE Transactions on Visualization and Computer Graphics, Sep./Oct. 2006, vol. 12 (5), pp. 733-740.
Sigelman B.H., et al., "Dapper, A Large-Scale Distributed Systems Tracing Infrastracture," Google Technical Report dapper-2010-1, Apr. 2010, 14 Pages, Retrieved from the Internet: URL: https://research.google/pubs/pub36356/.
Templeton S.J., et al., "Detecting Spoofed Packets," IEEE, Proceedings of the DARPA Information Survivability Conference and Exposition (DISCEX'03), 2003, pp. 1-12.
Theodorakopoulos G., et al., "On Trust Models and Trust Evaluation Metrics for Ad Hoc Networks," IEEE Journal on Selected Areas in Communications, Feb. 2006, vol. 24, No. 2, pp. 318-328.
Thomas R., "Bogon Dotted Decimal List," Version 7.0, Team Cymru NOC, Apr. 27, 2012, 5 Pages.
"Top 4 Strategies to Mitigate Targeted Cyber Intrusions," Cyber Security Operations Centre, Australian Government Department of Defence, Intelligence and Security, Jul. 2013, Retrieved from URL: http://www.asd.aov.au/infosec/tom-mitiqations/top-4-strategies-exolained.html, 42 Pages.
Voris J., et al., "Bait and Snitch: Defending Computer Systems with Decoys," Columbia University Libraries, Department of Computer Science, 2013, 25 pages.
Wang R., et al., "Learning Directed Acyclic Graphs Via Bootstrap Aggregating," Jun. 9, 2014, 47 pages, Retrieved from Internet: URL: http://arxiv.org/abs/1406.2098.
Wang Y., et al., "A Network Gene-Based Framework for Detecting Advanced Persistent Threats," 2014 Ninth International Conference on P2P, Parallel, Grid, Cloud and Internet Computing, Nov. 2014, IEEE, pp. 97-102.
Witze A., "Special Relativity Aces Time Trial, Time Dilation Predicted by Einstein Confirmed by Lithium Ion Experiment," Nature, Sep. 19, 2014, 3 Pages.
Woodberg B., "Snippet from Juniper SRX Series," O'Reilly Media, Inc, Rob Cameron Publisher, Jun. 17, 2013, 1 page.
Zatrochova B.Z., "Analysis and Testing of Distributed NoSQL Datastore Riak," Brno, May 28, 2015, 2 Pages.
Patrochova B.Z., "Analysis and Testing of Distributed NoSQL Datastore Riak," Masaryk University, Faculty of Informatics, Brno, Spring, 2015, 76 Pages.
Zeng S., et al., "Managing Risk in Multi-node Automation of Endpoint Management," IEEE Network Operations and Management Symposium (NOMS), 2014, 6 Pages, Retrieved from URL: https://ieeexplore.ieee.org/stamp/stamp.jsp?tp=&arnumber=6838295.
Zhang D., et al., "Packet Loss Measurement and Control for VPN based Services," Proceedings of IEEE Instrumentation and Measurement Technology Conference, May 17-19, 2005, vol. 3, 5 Pages.
Zhang Y., et al., "CANTINA: A Content-Based Approach to Detecting Phishing Web Sites," May 8-12, 2007, pp. 639-648.
"A Cisco Guide to Defending Against Distributed Denial of Service Attacks," Cisco Systems Incorporated, San Jose, California, [Last Visited May 3, 2016] Retrieved from URL: http://www.cisco.com/web/about/security/intelligence/guide_ddos_defense.html, 34 Pages.
Al-Fuqaha A., et al., "Internet of Things: A Survey on Enabling Technologies, Protocols, and Applications," IEEE Communication Surveys Tutorials, Fourth Quarter, Nov. 18, 2015, vol. 17, No. 4, pp. 2347-2376.
Ananthanarayanan R., et al., "Photon: Fault-tolerant and Scalable Joining of Continuous Data Streams," Proceedings of the ACM SIGMOD International Conference on Management of Data, New York, USA, Jun. 22-27, 2013, pp. 577-588.
Aniszczyk C., "Distributed Systems Tracing with Zipkin," Twitter Blog, Jun. 7, 2012, 3 Pages, [Retrieved on Jan. 26, 2021] Retrieved from URL: https://blog.twitter.com/engineering/en_us/a/2012/distributed-systems-tracing-with-zipkin.html.
Arista Networks, Inc., "Application Visibility and Network Telemtry Using Splunk," Arista White Paper, Nov. 2013, 9 Pages.

(56) References Cited

OTHER PUBLICATIONS

Author Unknown, "Blacklists Dynamic Blacklists Reputation: Understanding Why the Evolving Threat Eludes Blacklists," Retrieved from Internet: URL: www.dambala.com, 9 pages, Dambala, Atlanta, GA 30308, USA.
Aydin G., et al., "Architecture and Implementation of a Scalable Sensor Data Storage and Analysis System Using Cloud Computing and Big Data Technologies," Journal of Sensors, vol. 2015, Article 834217, Feb. 2015, 11 Pages.
Ayers A., et al., "TraceBack: First Fault Diagnosis by Reconstruction of Distributed Control Flow," Proceedings of the 2009 ACM SIGPLAN Conference on Programming Language Design and Implementation-PLDI '09, Jun. 12-15, 2005, vol. 40, No. 6, 13 pages.
Baah G.K., et al.,"The Probabilistic Program Dependence Graph and Its Application to Fault Diagnosis," IEEE Transactions on Software Engineering, IEEE Service Center, Los Alamitos, CA, US, Jul./Aug. 2010, vol. 36, No. 4, pp. 528-545, ISSN 0098-5589, XP011299543.
Backes M., et al., "Data Lineage in Malicious Environments," IEEE, 2015, pp. 1-13.
Baek K-H., et al., "Preventing Theft of Quality of Service on Open Platforms," Workshop of the 1st International Conference on Security and Privacy for Emerging Areas in Communication Networks, 2005, 12 Pages, Retrieved from URL: https://ieeexplore.ieee.org/stamp/stamp.jsp?tp=&arnumber=1588319.
Bayati M., et al., "Message-Passing Algorithms for Sparse Network Alignment," ACM Transactions on Knowledge Discovery from Data, vol. 7, No. 1, Article 3, Mar. 2013, 31 Pages.
Berezinski P., et al., "An Entropy-Based Network Anomaly Detection Method," Entropy, vol. 17, Apr. 20, 2015, Retrieved from URL: www.mdpi.com/journal/entropy, pp. 2367-2408.
Berthier R., et al., "Nfsight: Netflow-based Network Awareness Tool," In Proceedings of the 24th International Conference on Large Installation System Administration, USENIX Association, Berkeley, CA, USA, 2010, 16 Pages.
Bhuyan D., "Fighting Bots and Botnets," In Proceedings of the International Conference on i-Warfare and Security, Academic Conferences Limited, 2006, pp. 23-28.
Blair D., et al., U.S. Appl. No. 62/106,006, filed Jan. 21, 2015, entitled "Monitoring Network Policy Compliance," 22 Pages.
Bosch G., "Virtualization," Modified on Apr. 2010 by Davison B., 33 Pages.
Brahmi H.I., et al., "Improving Emergency Messages Transmission Delay in Road Monitoring Based WSNs," 6th Joint FIP Wireless and Mobile Networking Conference (WMNC), 2013, 8 Pages, [Retrieved on Aug. 31, 2021].
Breen C., "MAC 911: How to Dismiss Mac App Store Notifications," Macworld, Mar. 24, 2014, 3 Pages.
Brocade Communications Systems, Inc., "Chapter 5 Configuring Virtual LANs (VLANs)," Jun. 2009, 38 pages.
Chandran M., et al., "Monitoring in a Virtualized Environment," GSTF International Journal on Computing, Aug. 2010, vol. 1, No. 1, 6 Pages.
Chari S., et al., "Ensuring Continuous Compliance Through Reconciling Policy with Usage," Proceedings of the 18th ACM Symposium on Access Control Models andTechnologies, NewYork, United States of America, Jun. 12-14, 2013, pp. 49-60.
Chen X., et al., "Automating Network Application Dependency Discovery: Experiences, Limitations, and New Solutions," 8th USENIX Symposium on Operating Systems Design and Implementation (OSDI'08), Usenix Association, Berkeley, California, United States of America, retrieved Aug. 30, 2017, pp. 117-130.
Choi C.H., et al., "CSMonitor: A Visual Client/Server Monitor for CORBA-based Distributed Applications," Proceedings of 1998 Asia Pacific Software Engineering Conference, Taipei, Taiwan, Los Alamitos, CA, USA, Dec. 2-4, 1998, 8 Pages, DOI:10.1109/APSEC. 1998.733738, ISBN 978-0-8186-9183-6, XP010314829.
Chou C.W., et al., "Optical Clocks and Relativity," Science, vol. 329, Sep. 24, 2010, pp. 1630-1633.

Cisco Systems, "Cisco Network Analysis Modules (NAM) Tutorial," Cisco Systems, Inc., Version: 3.5, Accessed web page Oct. 13, 2015, 2006, 320 pages.
Cisco Systems Inc: "Addressing Compliance from One Infrastructure: Cisco Unified Compliance Solution Framework," 2014, 3 Pages.
Cisco Systems, Inc., "CCNA2 v3.1 Module 1 WANs and Routers," Cisco.com, May 14, 2018, 26 pages.
Cisco Systems, Inc., "CCNA2 v3.1 Module 2 Introduction to Routers," Cisco.com, Jan. 18, 2018, 23 pages.
Cisco Systems Inc: "Cisco 4710 Application Control Engine Appliance Hardware Installation Guide," Nov. 2007, 66 Pages.
Cisco Systems, Inc., "Cisco Application Control Engine (ACE) Troubleshooting Guide—Understanding the ACE Module Architecture and Traffic Flow," Mar. 11, 2011, 6 Pages.
Cisco Systems, Inc., "Cisco Application Dependency Mapping Service," Data Sheet, 2009, 5 pages.
Cisco Systems Inc: "Cisco Application Visibility and Control," At-A-Glance, Oct. 2011, 2 Pages.
Cisco Systems Inc: "Cisco Data Center Network Architecture and Solutions Overview," Feb. 2006, 19 Pages.
Cisco Systems, Inc., "Cisco IOS Configuration Fundamentals Configuration Guide: Using Autoinstall and Setup," Release 12.2, first published Apr. 2001, last updated Sep. 2003, 32 pages.
Cisco Systems Inc: "Cisco, Nexus 3000 Series NX-OS Release Notes, Release 5.0(3)U3(1)," Feb. 29, 2012, 16 Pages, Part No. OL-26631 -01.
Cisco Systems, Inc., "Cisco, Nexus 5000 Series and Cisco Nexus 2000 Series Release Notes, Cisco NX-OS Release 5.1 (3)N2(1b), NX-OS Release 5.1(3)N2(1a) and NX-OS Release 5.1 (3)N2(1)," Sep. 5, 2012, Part No. OL-26652-03 CO, Current Release: NX-OS Release 5.1(3)N2(1b), 24 pages.
Cisco Systems Inc: "Cisco Remote Integrated Service Engine for Citrix NetScaler Appliances and Cisco Nexus 7000 Series Switches Configuration Guide," Last modified Apr. 29, 2014, 78 Pages.
Cisco Systems Inc., "Cisco Tetration Platform Data Sheet," Cisco, Updated Mar. 5, 2018, 21 Pages.
Cisco Systems, Inc., "Cisco VN-Link: Virtualization-Aware Networking," A Technical Primer, 2009, 9 Pages.
Cisco Systems, Inc., "Cisco VPN Client User Guide for Windows," Release 4.6, Aug. 2004, 148 pages.
Cisco Systems Inc: "New Cisco Technologies Help Customers Achieve Regulatory Compliance," White Paper, 1992-2008, retrieved on Aug. 31, 2017, 9 Pages.
Cisco Systems Inc: "Nexus 3000 Series NX-OS Fundamentals Configuration Guide, Release 5.0(3)U3(1): Using PowerOn Auto Provisioning," Feb. 29, 2012, 10 Pages, Part No. OL-26544-01.
Cisco Systems Inc: "Quick Start Guide, Cisco ACE 4700 Series Application Control Engine Appliance," Software Version A5(1.0), Sep. 2011, 138 Pages.
Cisco Systems Inc: "Routing and Bridging Guide, Cisco ACE Application Control Engine," Software Version A5 (1.0), Sep. 2011, 248 Pages.
Cisco Systems, Inc., "VMWare and Cisco Virtualization Solution: Scale Virtual Machine Networking," Jul. 2009, pp. 1-4.
Cisco Technology Inc: "Cisco IOS Software Release 12.4T Features and Hardware Support," Feb. 2009, 174 Pages, Retrieved from URL: http://www.cisco.com/c/en/us/Qroducts/collateralhos-nx-os-softwarehossoftware-releases-12-4-t/product bulletin_c25-409474. html.
Cisco Technology Inc., "Lock-and-Key: Dynamic Access Lists," Updated Jul. 12, 2006, Retrieved from URL: http://www/cisco.com/c/en/us/suppor/docs/security-ypn/lock-key/7604-13.html, 16 Pages.
Citirx, "AppFlow: Next-Generation Application Performance Monitoring," Citirx.com, 2011, pp. 1-8.
Costa R., et al., "An Intelligent Alarm Management System for Large-Scale Telecommunication Companies," In Portuguese Conference on Artificial Intelligence, Oct. 2009, 14 Pages, Retrieved from the Internet: URL: https://repositorium.sdum.uminho.Pt/bitstream/1822/11357/1/154-2.pdf.
Ari Juels, RFID Security and Privacy: A Research Survey (Feb. 2006), IEEE Journal on Selected Areas in Communications, vol. 24, No. 2 (Year: 2006).

(56) References Cited

OTHER PUBLICATIONS

De Carvalho T.F.R., "Root Cause Analysis in Large and Complex Networks," Mestrado Em Seguranca Informatica, Dec. 2008, 66 Pages.
Diaz J.M., et al., "A Simple Closed-Form Approximation for the Packet Loss Rate of a TCP Connection Over Wireless Links," IEEE Communications Letters, Sep. 2014, vol. 18, No. 9, 4 Pages.
Duan Y., et al., "Detective: Automatically Identify and Analyze Malware Processes in Forensic Scenarios via DLLs," IEEE ICC—Next Generation Networking Symposium, 2015, pp. 5691-5696.
"Effective use of Reputation Intelligence in a Security Operations Center: Tailoring HP Reputation Security Monitor to your Needs," HP Technical White Paper, Copyright, Jul. 2013, Rev. 1, pp. 1-6.
Extended European Search Report for European Application No. 19215055.5, mailed Jan. 17, 2020, 9 Pages.
Extended European Search Report for European Application No. 20165008.2, mailed May 25, 2020, 6 pages.
Extended European Search Report for European Application No. 21150804.9, mailed May 6, 2021, 8 Pages.
Extended European Search Report for European Application No. 21156151.9, mailed May 25, 2021, 8 pages.
Extended European Search Report for European Application No. 21190461.0, mailed Mar. 1, 2022, 10 Pages.
Feinstein L., et al., "Statistical Approaches to DDOS Attack Detection and Response," Proceedings of the DARPA Information Survivability Conference and Exposition, Apr. 22-24, 2003, vol. 1, pp. 303-314.
Foundation for Intelligent Physical Agents, "FIPA Agent Message Transport Service Specification," Dec. 3, 2002, 15 Pages, Retrieved from the Internet: URL: http://www.fiDa.org.
George A., et al., "NetPal: A Dynamic Network Administration Knowledge Base," In proceedings of the 2008 Conference of the Center for Advanced Studies on Collaborative Research: Meeting of Minds (CASCON '08), Marsha Chechik, Mark Vigder, and Darlene Stewart Editions, ACM, NewYork, United States of America, Article 20, 2008, 14 Pages.
Gia T.N., et al., "Fog Computing in Healthcare Internet of Things: A Case Study on ECG Feature Extraction," IEEE International Conference on Computer and Information Technology, Ubiquitous Computing and Communications, Dependable, Autonomic and Secure Computing, Pervasive Intelligence and Computing, Oct. 26, 2015, pp. 356-363.
Github, "OpenTracing," 10 pages, Retrieved on Jul. 5, 2023, from URL: https://github.com/opentracing/specification/blob/master/specification.md.
Goins A., et al., "Diving Deep into Kubernetes Networking," Rancher, Jan. 2019, 42 pages.
Goldsteen A., et al., "A Tool for Monitoring and Maintaining System Trustworthiness at RunTime," REFSQ, 2015, bp. 142-147.
Grove D., et al., "Call Graph Construction in Object-Oriented Languages," ACM Object-oriented Programming, Systems, Languages, and Applications—OOPSLA '97 Conference Proceedings, Oct. 1997, 18 pages.
Hamadi S., et al., "Fast Path Acceleration for Open vSwitch in Overlay Networks," Global Information Infrastructure and Networking Symposium (GIIS), Montreal, QC, Sep. 15-19, 2014, 5 pages.
Heckman S., et al., "On Establishing a Benchmark for Evaluating Static Analysis Alert Prioritization and Classification Techniques," IEEE, Oct. 9-10, 2008, 10 Pages.
Henke C., et al., "Evaluation of Header Field Entropy forHash-Based Packet Selection," based on Search String from Google: "entropy header fields," Obtained on: Nov. 12, 2019, Passive and Active Network Measurement—PAM, 2008, vol. 4979, pp. 82-91.
Hideshima Y., et al., "STARMINE: A Visualization System for Cyber Attacks," Australian Computer Society, Inc., Jan. 2006, Asia-Pacific Symposium on Information Visualization (APVIS 2006), Tokyo, Japan, Feb. 2006, pp. 1-9, Retrieved from the Internet: URL: htps://www.researchgate.net/publication/221536306.
Hogg S., "Not your Father's Flow Export Protocol (Part 2), What is AppFlow and how does it Differ From Other Flow Analysis Protocols?," Core Networking, Mar. 19, 2014, 6 pages.
Huang D-J., et al., "Clock Skew Based Node Identification in Wireless Sensor Networks," IEEE GLOBECOM, 2008, 5 Pages.
Ihler A., et al., "Learning to Detect Events With Markov-Modulated Poisson Processes," ACM Transactions on Knowledge Discovery From Data, Dec. 2007, vol. 1, No. 3, Article 13, p. 13:1 to 13:23.
International Search Report and Written Opinion for International Application No. PCT/US2016/035348, mailed Jul. 27, 2016, 8 pages.
International Search Report and Written Opinion for International Application No. PCT/US2016/035349, mailed Jul. 27, 2016, 8 pages.
International Search Report and Written Opinion for International Application No. PCT/US2016/035350, mailed Aug. 17, 2016, 13 pages.
International Search Report and Written Opinion for International Application No. PCT/US2016/035351, mailed Aug. 10, 2016, 15 pages.
InternetPerils, Inc., "Control Your Internet Business Risk," 2003-2015, 3 Pages, [Retrieved on Apr. 21, 2016], Retrieved from the Internet: URL: https://www.internetperils.com.
Ives H.E., et al., "An Experimental Study of the Rate of a Moving Atomic Clock," Journal of the Optical Society of America, Jul. 1938, vol. 28, No. 7, pp. 215-226.
Janoff, Christian, et al., "Cisco Compliance Solution for HIPAA Security Rule Design and Implementation Guide," Cisco Systems, Inc., Updated Nov. 14, 2015, 938 Pages.
Joseph D., et al., "Modeling Middleboxes," IEEE Network, Sep./Oct. 2008, pp. 20-25.
Kalyanasundaram B., et al., "Using Mobile Data Collectors to Federate Clusters of Disjoint Sensor Network Segments," IEEE, International Conference on Communications, Department of Computer Science and Electrical Engineering, University of Maryland Baltimore County, 2013, pp. 1496-1500.
Kent S., et al., "Security Architecture for the Internet Protocol," Network Working Group, Nov. 1998, 67 Pages.
Kerrison A., et al., "Four Steps to Faster, Better Application Dependency Mapping—Laying the Foundation for Effective Business Service Models," BMCSoftware, 2011, 12 Pages.
Kim M-S., et al., "A Flow-based Method for Abnormal Network Traffic Detection," Institute of Electrical and Electronics Engineers—IEEE, 2004, pp. 599-612.
Kraemer B., "Get to Know Your Data Center with CMDB," TechTarget, [Retrieved on Apr. 19, 2016], Apr. 5, 2006, 3 pages, Retrieved from the Internet: URL: http://searchdatacenter.techtarget.com/news/1178820/Get-to-know-your-data-center-with-CMDB.
Kubernetes Blog, "Borg: The Predecessor to Kubernetes," Apr. 23, 2015, 2 pages, Retrieved from URL: https://kubernetes.io/blog/2015/04/borg-predecessor-to-kubernetes/.
Kubernetes IO, "Kubernetes Components," Aug. 28, 2020, 4 pages, Retrieved from URL: https://kubernetes.io/docs/concepts/overview/components/.
Kubernetes IO, "Nodes," Jan. 12, 2021, 6 pages, Retrieved from URL: https://kubernetes.io/docs/concepts/architecture/nodes/.
Kubernetes IO, "Pods," Jan. 12, 2021, 5 pages, Retrieved from URL: https://kubernetes.io.docs/concepts/workloads/pods/pod/.
Kubernetes IO, "What is Kubernetes?," Oct. 22, 2020, 3 pages, Retrieved from URL: https://kubernetes.io/docs/concepts/overview/what-is-kubernetes/.
Lab SKU: "VMware Hands-on Labs—HOL-SDC-1301," Lab Overview, 2013, [Version Mar. 21, 2014-Jul. 9, 2016] Retrieved from URL: http://docs.hol.vmware.com/HOL-2013/hol-sdc-1301_html_en/, Uploaded in 2 Parts, 118 Pages.
Achance M., "Dirty Little Secrets of Application Dependency Mapping—www.itsmwatch.com," Dec. 26, 2007, 3 pages.
Andman Y., et al., "Dependency Analyzer," JFrog Wiki, Feb. 14, 2008, 1 Page, [Retrieved on Apr. 22, 2016] Retrieved from URL: http://frog.com/confluence/display/DA/Home.
Lee S., "Reducing Complexity of Large-Scale Network Configuration Management," Ph.D. Dissertation, Carniege Mellon University, Pittsburg, PA, May 2010, 200 Pages.

(56) References Cited

OTHER PUBLICATIONS

Li A., et al., "Fast Anomaly Detection for Large Data Centers," IEEE Global Telecommunications Conference (GLOBECOM), Dec. 2010, 6 Pages.

Li B., et al., "A Supervised Machine Learning Approach to Classify Host Roles on Line Using Sflow," In Proceedings of the First Edition Workshop on High Performance and Programmable Networking, Association for Computing Machinery—ACM, New York, USA, Jun. 18, 2013, pp. 53-60, Provided in IDS dated Apr. 27, 2016.

Liu T., et al., "Impala: A Middleware System For Managing Autonomic, Parallel Sensor Systems," In Proceedings of the Ninth ACM SIGPLAN Symposium on Principles and Practice of Parallel Programming, ACM, New York, United States of America, Jun. 11-13, 2003, 12 Pages.

Lorenzo G.D., et al., "EXSED: An Intelligent Tool for Exploration of Social Events Dynamics from Augmented Trajectories," IEEE 14th International Conference on Mobile Data Management (MDM), Jun. 3-6, 2013, vol. 1, pp. 323-330.

\* cited by examiner

UNIQUE ID GENERATION FOR SENSORS

CROSS-REFERENCE TO RELATED APPLICATIONS

This application is a continuation of U.S. Non-Provisional patent application Ser. No. 16/941,426, filed on Jul. 28, 2020, which in turn, is a continuation of U.S. Non-Provisional patent application Ser. No. 15/163,605, filed May 24, 2016, now granted U.S. Pat. No. 10,735,283, which claims the benefit of U.S. Provisional Application No. 62/171,899, filed Jun. 5, 2015, the contents of which are incorporated herein by reference in their entireties.

TECHNICAL FIELD

The present technology pertains to network analytics, and more specifically to sensors in a network environment.

BACKGROUND

A modern computer network may comprise a large number of sensors. It is possible that there are one or more identification (ID) collisions between assigned IDs of these sensors. It may be an issue for sensors assigned with conflicted IDs to effectively communicate with other sensors or nodes in the network.

Thus, there is a need to generate and assign unique sensor IDs in a network.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof, which are illustrated in the appended drawings. Understanding that these drawings depict only exemplary examples of the disclosure and are not therefore to be considered to be limiting of its scope, the principles herein are described and explained with additional specificity and detail through the use of the accompanying drawings in which.

DESCRIPTION OF EXAMPLES

Figure 1:
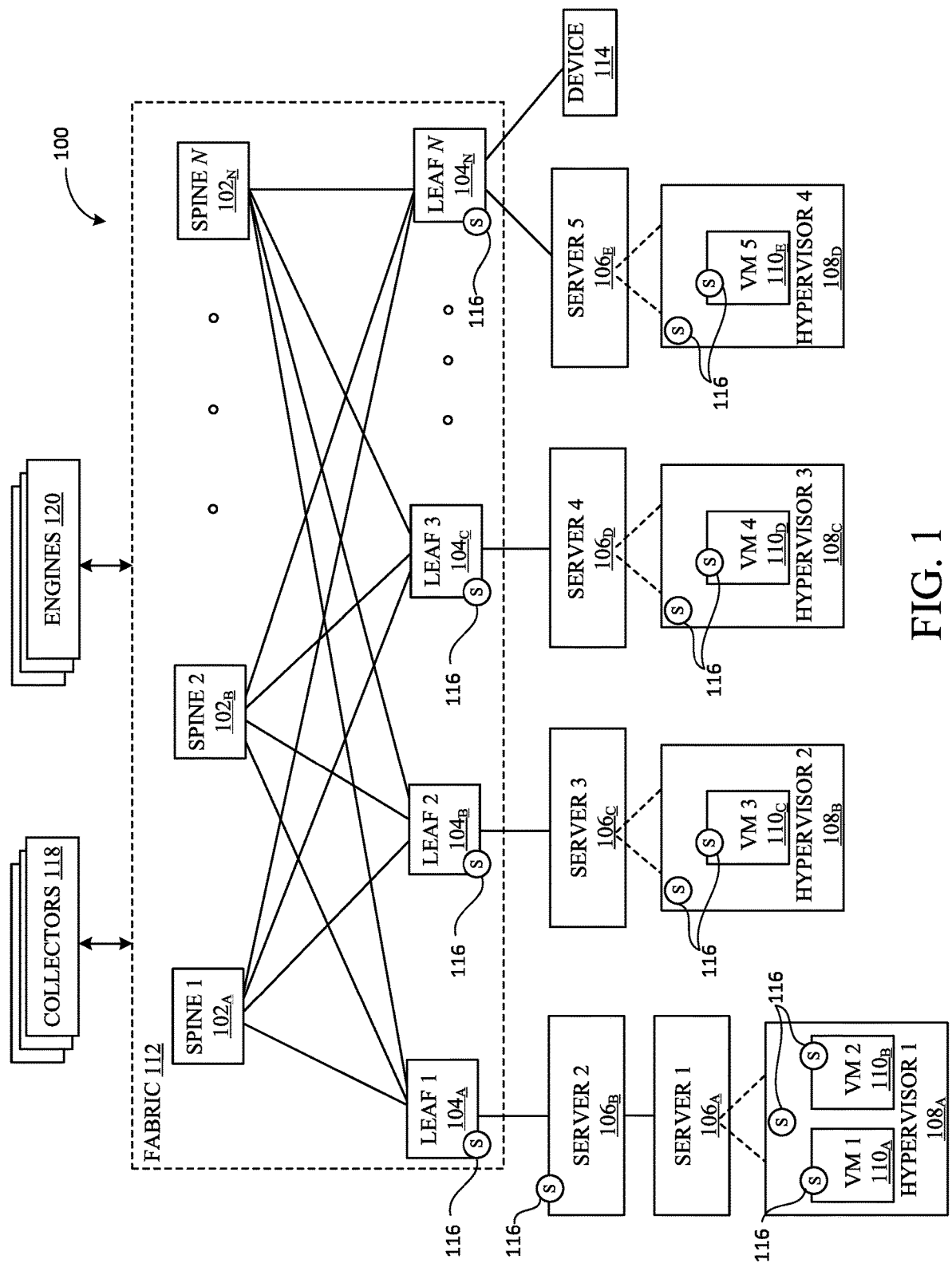
FIG. 1 illustrates a diagram of an example network environment, according to some examples.

Various examples of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to deploy sensors in a network environment, assign unique identifications (IDs) for the sensors, and analyze data collected from the sensors to monitor and troubleshoot the network. For examples, sensors can be placed at various devices or components in the network to collect flow data and network statistics from various network nodes. Once a sensor is installed on a component (e.g., a virtual machine (VM)) of the network, the sensor can send attributes of the sensor to a control server of the network. The attributes of the sensor can include at least one unique identifier of the sensor or the host component of the sensor. The control server can determine a hash value using a one-way hash function and a secret key, send the hash value to the sensor, and designate the hash value as a sensor ID of the sensor. In response to receiving the sensor ID, the sensor can incorporate the sensor ID in subsequent communication messages. Other components of the network can verify the validity of the sensor using a hash of the at least one unique identifier of the sensor and the secret key.

The at least one unique identifier of the sensor or the host component of the sensor may include, but is not limited to, host name, media access control (MAC) address, and BIOS_UUID etc. The BIOS_UUID is a universally unique identifier (UUID) of a part of the basic input/output system (BIOS) of the host component.

Some examples can migrate a sensor across a network together with a host component of the sensor. For example, the sensor may be migrated together with a VM host. Since the VM host is not changed, host name, the MAC address, and/or BIOS_UUID associated with the sensor remain unchanged. The control server may determine the same hash value as the sensor ID for the sensor.

In some examples, a host component hosting a sensor can be cloned to host the sensor. Since the cloned host component has a different host name, MAC address, and/or BIOS_UUID, the sensor reports a different unique identifier to a controller server. The control server can determine a new hash value using the one-way hash function and the secret key, and then assign the new hash value as a new sensor ID for the sensor.

In some examples, a hash value is a fixed-length hash value using a one-way hash function and various lengths of an input that comprises host name, MAC address, and/or BIOS_UUID. Even a slight change in an input string may cause the hash value to change drastically. For example, if 1 bit of the input string is flipped, at least half of the bits in the hash value may be flipped as a result. It's difficult for either context or length of the input to be recovered. The one-way hash function may include, but is not limited to, hashed message authentication code (HMAC), message digest 2 (MD2), MD4, MD5, secure hash algorithm-1 (SHA-1), SHA-2, and SHA-3. A length of the fixed-length hash value can be at least 64-bit. For example, a length of the fixed-length hash value can be 128-bit using MD2 or 160-bit using SHA-1.

In some examples, a hash value determined has an arbitrary output length using a one-way hash function and various lengths of an input that comprises host name, MAC address, and/or BIOS_UUID. The one-way hash function may include, but is not limited to, a family of sponge functions such as KECCAK.

DETAILED DESCRIPTION

Figure 2A:
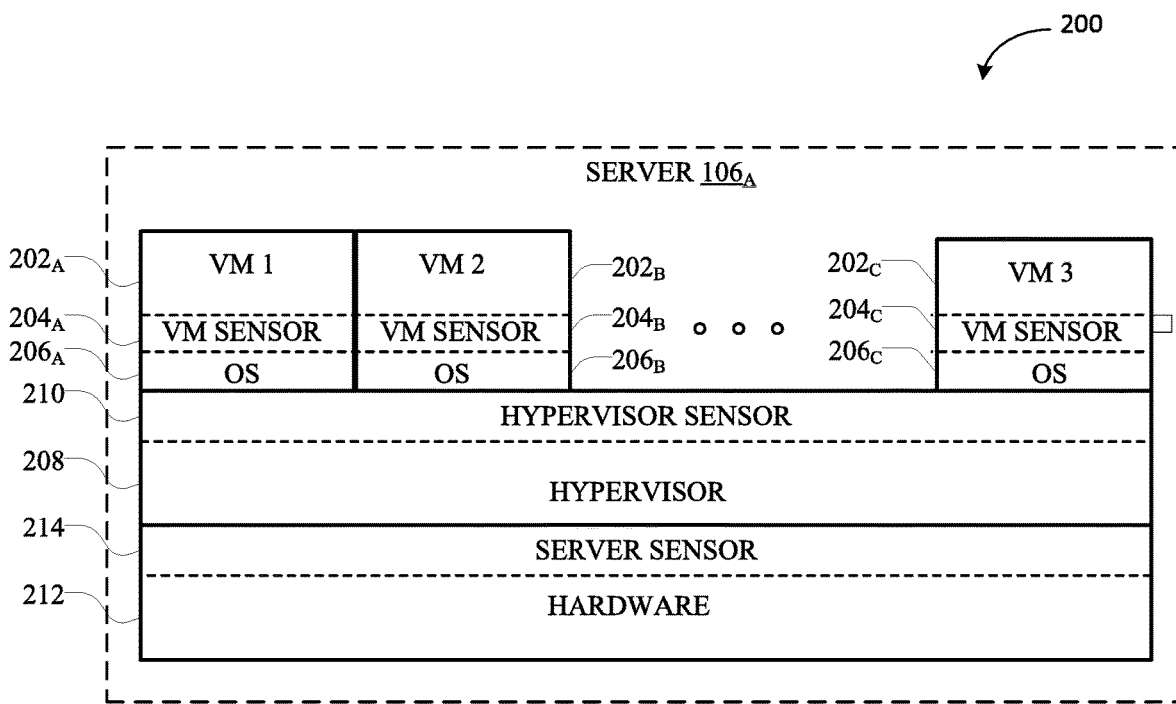
FIG. 2A illustrates a schematic diagram of an example sensor deployment in a virtualized environment, according to some examples.
Figure 2B:
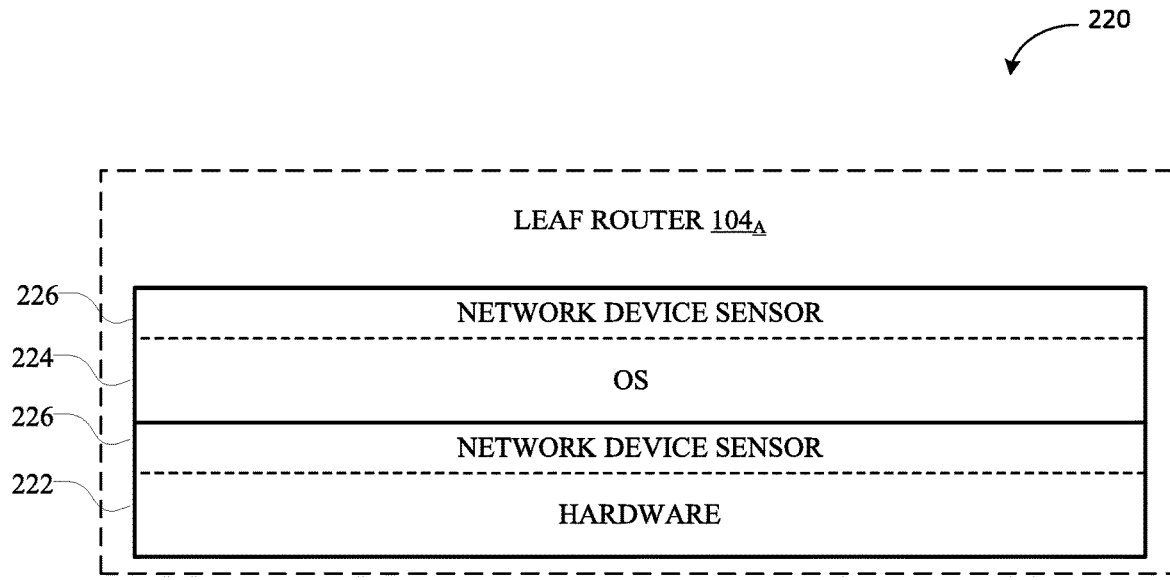
FIG. 2B illustrates a schematic diagram of an example sensor deployment in an example network device, according to some examples.
Figure 2C:
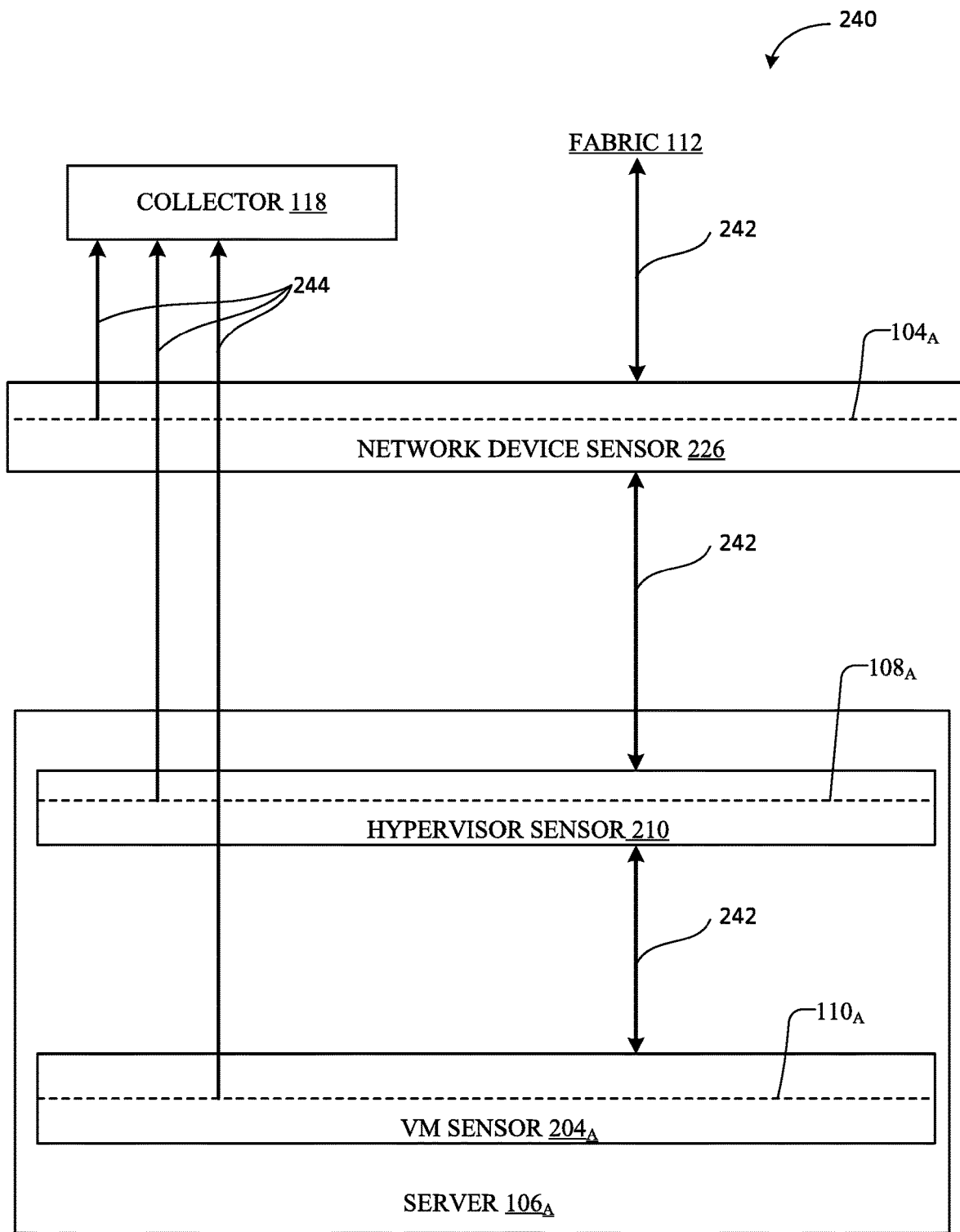
FIG. 2C illustrates a schematic diagram of an example reporting system in an example sensor topology, according to some examples.
Figure 3:
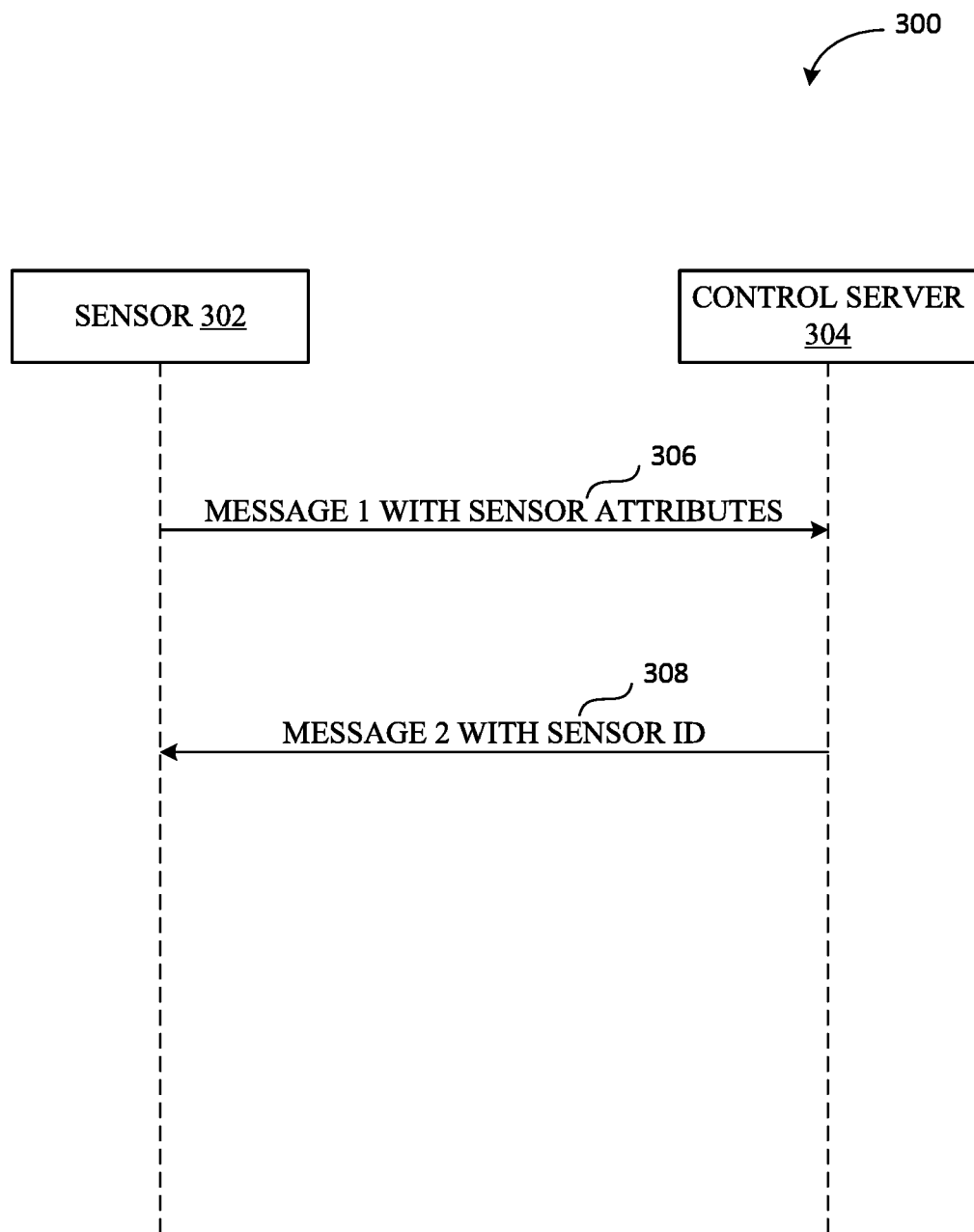
FIG. 3 illustrates a sequence diagram of an example communication between a sensor and a control server, according to some examples.
Figure 4:
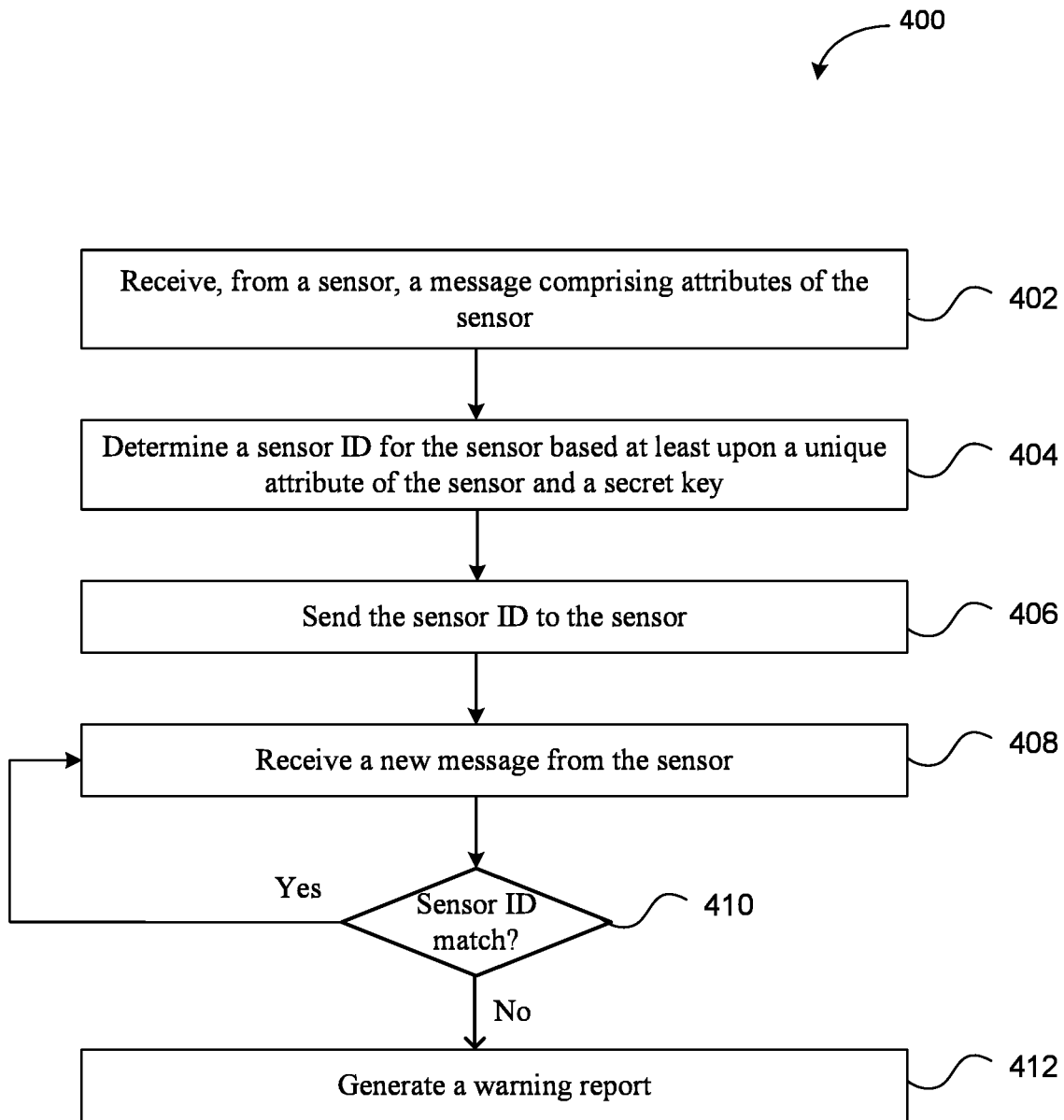
FIG. 4 illustrates an example method for generating a unique ID for a sensor in a network, according to some examples.
Figure 5:
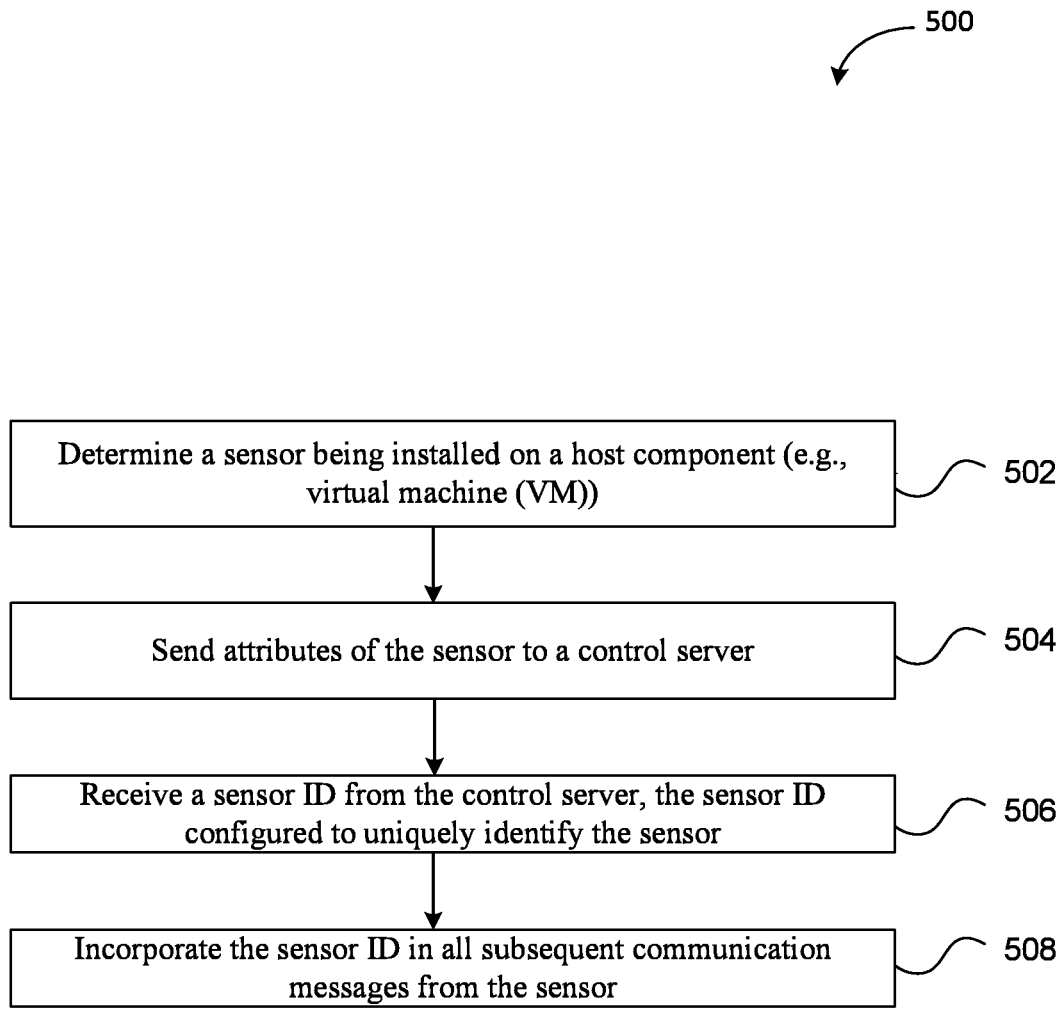
FIG. 5 illustrates another example method for generating a unique ID for a sensor in a network, according to some examples.
Figure 6:
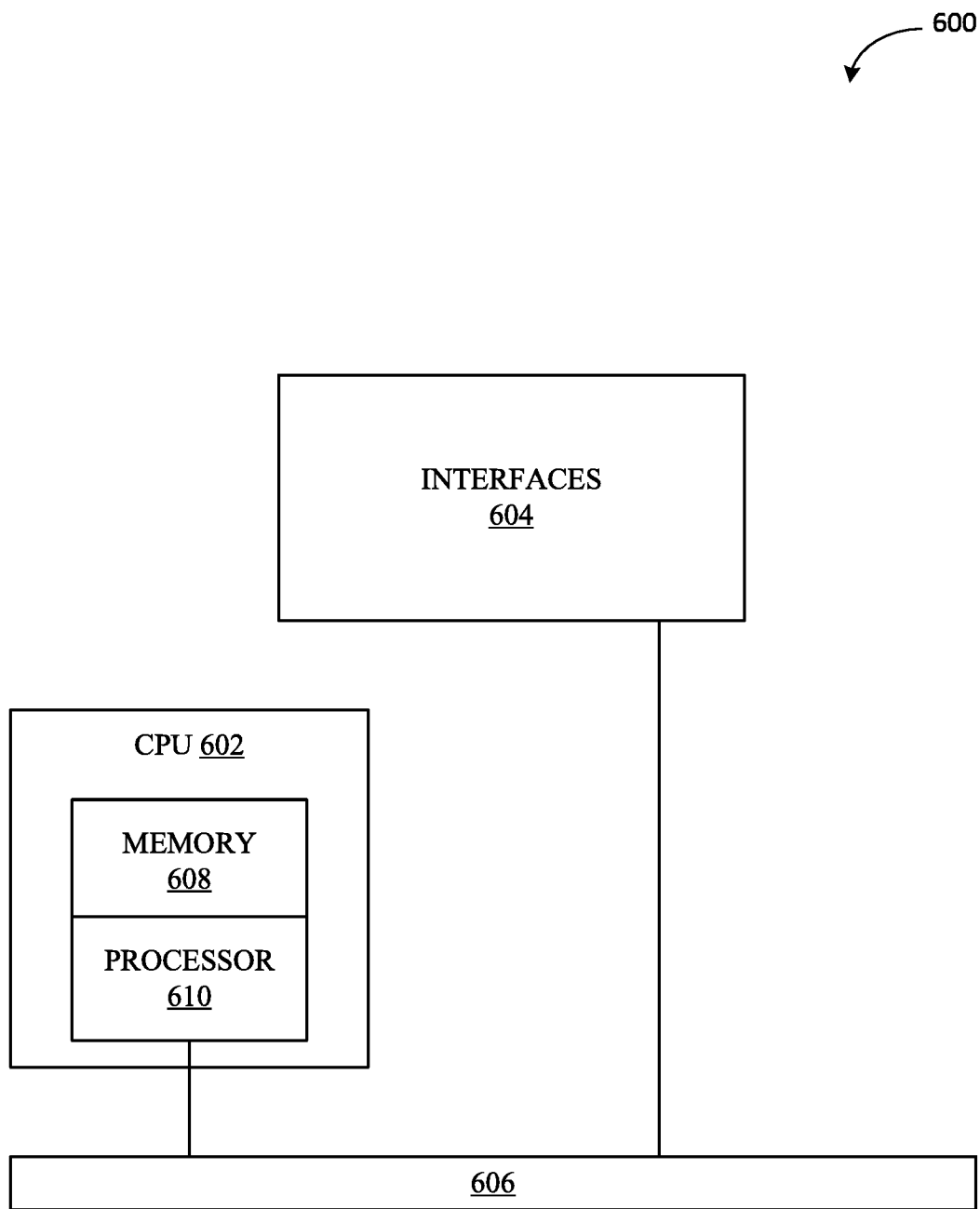
FIG. 6 illustrates an example network device, according to some examples.
Figure 7A:
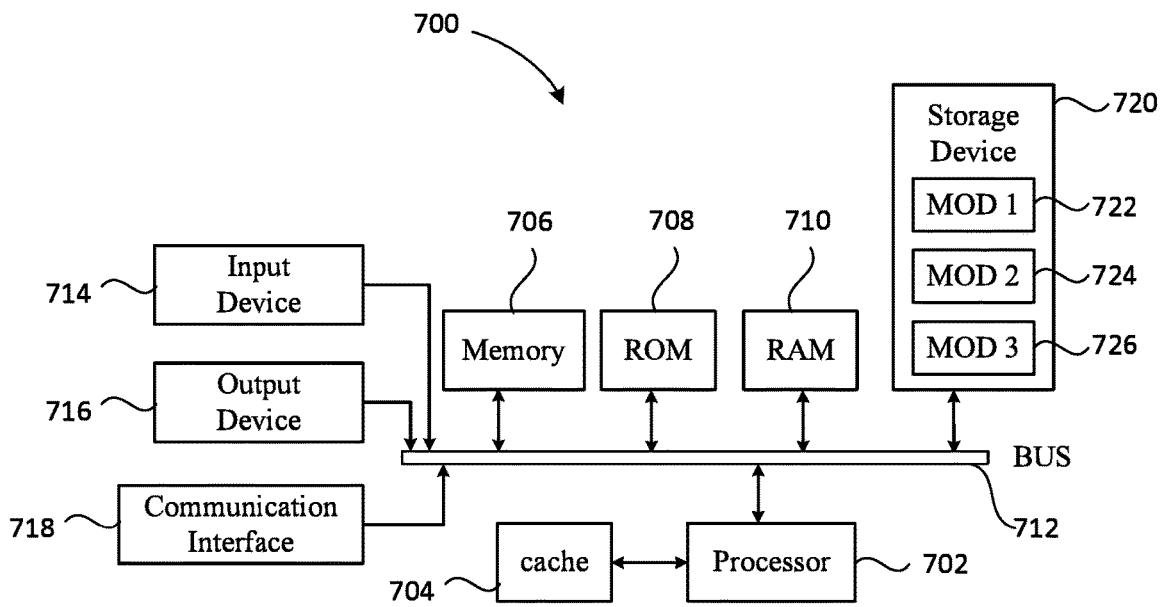
FIGS. 7A and 7B illustrate example system examples.
Figure 7B:
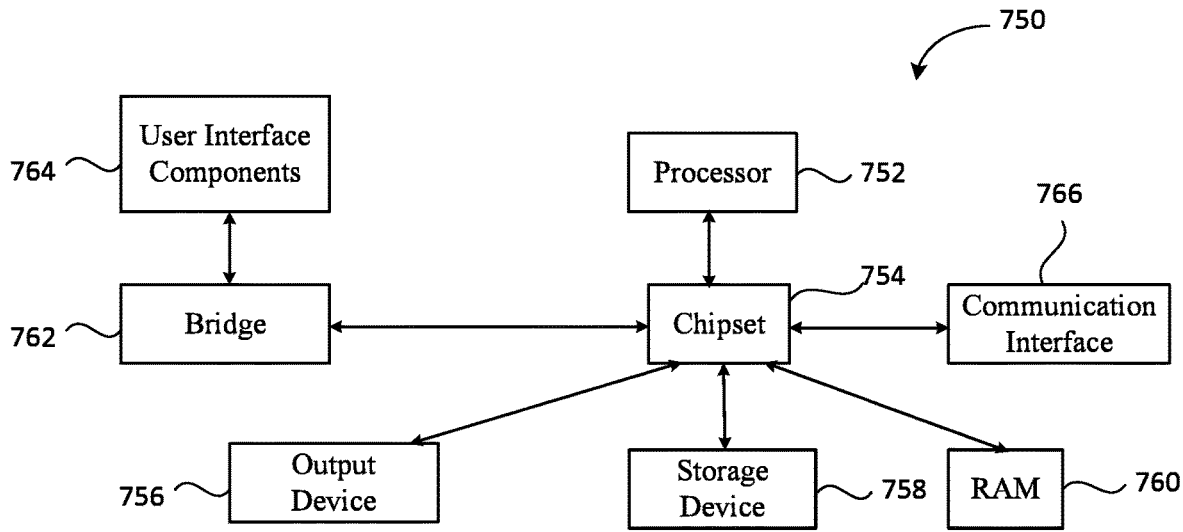

The disclosed technology addresses the need in the art for generating unique sensor IDs in a network. Disclosed are systems, methods, and computer-readable storage media for generating a unique sensor ID for a sensor in a network based on information collected from the sensor. A description of an example network environment, as illustrated in FIG. 1, is first disclosed herein. A discussion of sensors and sensor topologies in virtualized environments, as illustrated in FIGS. 2A-C, will then follow. The discussion follows with a discussion of mechanisms for generating a unique sensor ID, as illustrated in FIG. 3. Then, example methods practiced according to the various examples disclosed herein will be discussed, as illustrated in FIGS. 4-5. The discussion then concludes with a description of example devices, as illustrated in FIGS. 6 and 7A-B. These variations shall be described herein as the various examples are set forth. The disclosure now turns to FIG. 1.

FIG. 1 illustrates a diagram of example network environment 100. Fabric 112 can represent the underlay (i.e., physical network) of network environment 100. Fabric 112 can include spine routers 1-N ($102_{A-N}$) (collectively "102") and leaf routers 1-N ($104_{A-N}$) (collectively "104"). Leaf routers 104 can reside at the edge of fabric 112, and can thus represent the physical network edges. Leaf routers 104 can be, for example, top-of-rack ("ToR") switches, aggregation switches, gateways, ingress and/or egress switches, provider edge devices, and/or any other type of routing or switching device.

Leaf routers 104 can be responsible for routing and/or bridging tenant or endpoint packets and applying network policies. Spine routers 102 can perform switching and routing within fabric 112. Thus, network connectivity in fabric 112 can flow from spine routers 102 to leaf routers 104, and vice versa.

Leaf routers 104 can provide servers 1-5 ($106_{A-E}$) (collectively "106"), hypervisors 1-4 ($108_A$-$108_D$) (collectively "108"), and virtual machines (VMs) 1-5 ($110_A$-$110_E$) (collectively "110") access to fabric 112. For example, leaf routers 104 can encapsulate and decapsulate packets to and from servers 106 in order to enable communications throughout environment 100. Leaf routers 104 can also connect other devices, such as device 114, with fabric 112. Device 114 can be any network-capable device(s) or network(s), such as a firewall, a database, a server, a collector 118 (further described below), an engine 120 (further described below), etc. Leaf routers 104 can also provide any other servers, resources, endpoints, external networks, VMs, services, tenants, or workloads with access to fabric 112.

VMs 110 can be virtual machines hosted by hypervisors 108 running on servers 106. VMs 110 can include workloads running on a guest operating system on a respective server. Hypervisors 108 can provide a layer of software, firmware, and/or hardware that creates and runs the VMs 110. Hypervisors 108 can allow VMs 110 to share hardware resources on servers 106, and the hardware resources on servers 106 to appear as multiple, separate hardware platforms. Moreover, hypervisors 108 and servers 106 can host one or more VMs 110. For example, server $106_A$ and hypervisor $108_A$ can host VMs $110_{A-B}$.

In some cases, VMs 110 and/or hypervisors 108 can be migrated to other servers 106. For example, VM $110_A$ can be migrated to server $106_C$ and hypervisor $108_B$. Servers 106 can similarly be migrated to other locations in network environment 100. For example, a server connected to a specific leaf router can be changed to connect to a different or additional leaf router. In some cases, some or all of servers 106, hypervisors 108, and/or VMs 110 can represent tenant space. Tenant space can include workloads, services, applications, devices, and/or resources that are associated with one or more clients or subscribers. Accordingly, traffic in network environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants.

Any of leaf routers 104, servers 106, hypervisors 108, and VMs 110 can include sensor 116 (also referred to as a "sensor") configured to capture network data, and report any portion of the captured data to collector 118. Sensors 116 can be processes, agents, modules, drivers, or components deployed on a respective system (e.g., a server, VM, hypervisor, leaf router, etc.), configured to capture network data for the respective system (e.g., data received or transmitted by the respective system), and report some or all of the captured data to collector 118.

For example, a VM sensor can run as a process, kernel module, or kernel driver on the guest operating system installed in a VM and configured to capture data (e.g., network and/or system data) processed (e.g., sent, received, generated, etc.) by the VM. Additionally, a hypervisor sensor can run as a process, kernel module, or kernel driver on the host operating system installed at the hypervisor layer and configured to capture data (e.g., network and/or system data) processed (e.g., sent, received, generated, etc.) by the hypervisor. A server sensor can run as a process, kernel module, or kernel driver on the host operating system of a server and configured to capture data (e.g., network and/or system data) processed (e.g., sent, received, generated, etc.) by the server. And a network device sensor can run as a process or component in a network device, such as leaf routers 104, and configured to capture data (e.g., network and/or system data) processed (e.g., sent, received, generated, etc.) by the network device.

Sensors 116 can be configured to report the observed data and/or metadata about one or more packets, flows, communications, processes, events, and/or activities to collector 118. For example, sensors 116 can capture network data as well as information about the system or host of the sensors 116 (e.g., where the sensors 116 are deployed). Such information can also include, for example, data or metadata of active or previously active processes of the system, operating system user identifiers, metadata of files on the system, system alerts, networking information, etc. Sensors 116 may also analyze all the processes running on the respective VMs, hypervisors, servers, or network devices to determine specifically which process is responsible for a particular flow of network traffic. Similarly, sensors 116 may determine which operating system user(s) is responsible for a given flow. Reported data from sensors 116 can provide details or statistics particular to one or more tenants. For example, reported data from a subset of sensors 116 deployed throughout devices or elements in a tenant space can provide information about the performance, use, quality, events, processes, security status, characteristics, statistics, patterns, conditions, configurations, topology, and/or any other information for the particular tenant space.

Collectors 118 can be one or more devices, modules, workloads and/or processes capable of receiving data from sensors 116. Collectors 118 can thus collect reports and data from sensors 116. Collectors 118 can be deployed anywhere in network environment 100 and/or even on remote networks capable of communicating with network environment 100. For example, one or more collectors can be deployed within fabric 112 or on one or more of the servers 106. One or more collectors can be deployed outside of fabric 112 but connected to one or more leaf routers 104. Collectors 118 can be part of servers 106 and/or separate servers or devices (e.g., device 114). Collectors 118 can also be implemented in a cluster of servers.

Collectors 118 can be configured to collect data from sensors 116. In addition, collectors 118 can be implemented in one or more servers in a distributed fashion. As previously noted, collectors 118 can include one or more collectors. Moreover, each collector can be configured to receive reported data from all sensors 116 or a subset of sensors 116. For example, a collector can be assigned to a subset of sensors 116 so the data received by that specific collector is limited to data from the subset of sensors.

Collectors 118 can be configured to aggregate data from all sensors 116 and/or a subset of sensors 116. Moreover, collectors 118 can be configured to analyze some or all of the data reported by sensors 116. For example, collectors 118 can include analytics engines (e.g., engines 120) for analyzing collected data. Environment 100 can also include separate analytics engines 120 configured to analyze the data reported to collectors 118. For example, engines 120 can be configured to receive collected data from collectors 118 and aggregate the data, analyze the data (individually and/or aggregated), generate reports, identify conditions, compute statistics, visualize reported data, troubleshoot conditions, visualize the network and/or portions of the network (e.g., a tenant space), generate alerts, identify patterns, calculate misconfigurations, identify errors, generate suggestions, generate testing, and/or perform any other analytics functions.

While collectors 118 and engines 120 are shown as separate entities, this is for illustration purposes as other configurations are also contemplated herein. For example, any of collectors 118 and engines 120 can be part of a same or separate entity. Moreover, any of the collector, aggregation, and analytics functions can be implemented by one entity (e.g., collectors 118) or separately implemented by multiple entities (e.g., engine 120 and/or collectors 118).

Each of the sensors 116 can use a respective address (e.g., internet protocol (IP) address, port number, etc.) of their host to send information to collectors 118 and/or any other destination. Collectors 118 may also be associated with their respective addresses such as IP addresses. Moreover, sensors 116 can periodically send information about flows they observe to collectors 118. Sensors 116 can be configured to report each and every flow they observe. Sensors 116 can report a list of flows that were active during a period of time (e.g., between the current time and the time of the last report). The consecutive periods of time of observance can be represented as pre-defined or adjustable time series. The series can be adjusted to a specific level of granularity. Thus, the time periods can be adjusted to control the level of details in statistics and can be customized based on specific requirements, such as security, scalability, storage, etc. The time series information can also be implemented to focus on more important flows or components (e.g., VMs) by varying the time intervals. The communication channel between a sensor and collector 118 can also create a flow in every reporting interval. Thus, the information transmitted or reported by sensors 116 can also include information about the flow created by the communication channel.

FIG. 2A illustrates a schematic diagram of an example sensor deployment 200 in a virtualized environment. Server 106$_A$ can execute and host one or more VMs 202$_{A-C}$ (collectively "202"). VMs 202$_{A-C}$ can be similar to VMs 110$_A$-E of FIG. 1. For example, VM 1 (202$_A$) of FIG. 2A can be VM 1 (110$_A$) of FIG. 1, and so forth. VMs 202 can be configured to run workloads (e.g., applications, services, processes, functions, etc.) based on hardware resources 212 on server 106$_A$. VMs 202 can run on guest operating systems 206$_{A-C}$ (collectively "206") on a virtual operating platform provided by hypervisor 208. Each VM 202 can run a respective guest operating system 206 which can be the same or different as other guest operating systems 206 associated with other VMs 202 on server 106$_A$. Each of guest operating systems 206 can execute one or more processes, which may in turn be programs, applications, modules, drivers, services, widgets, etc. Each of guest operating systems 206 may also be associated with one or more user accounts. For example, many popular operating systems such as LINUX, UNIX, WINDOWS, MAC OS, etc., offer multi-user environments where one or more users can use the system concurrently and share software/hardware resources. One or more users can sign in or log in to their user accounts associated with the operating system and run various workloads. Moreover, each VM 202 can have one or more network addresses, such as an internet protocol (IP) address. VMs 202 can thus communicate with hypervisor 208, server 106$_A$, and/or any remote devices or networks using the one or more network addresses.

Hypervisor 208 (otherwise known as a virtual machine monitor) can be a layer of software, firmware, and/or hardware that creates and runs VMs 202. Guest operating systems 206 running on VMs 202 can share virtualized hardware resources created by hypervisor 208. The virtualized hardware resources can provide the illusion of separate hardware components. Moreover, the virtualized hardware resources can perform as physical hardware components (e.g., memory, storage, processor, network interface, etc.), and can be driven by hardware resources 212 on server 106$_A$. Hypervisor 208 can have one or more network addresses, such as an internet protocol (IP) address, to communicate with other devices, components, or networks. For example, hypervisor 208 can have a dedicated IP address which it can use to communicate with VMs 202, server 106$_A$, and/or any remote devices or networks.

Hardware resources 212 of server 106$_A$ can provide the underlying physical hardware that drives operations and functionalities provided by server 106$_A$, hypervisor 208, and VMs 202. Hardware resources 212 can include, for example, one or more memory resources, one or more storage resources, one or more communication interfaces, one or more processors, one or more circuit boards, one or more buses, one or more extension cards, one or more power supplies, one or more antennas, one or more peripheral components, etc. Additional examples of hardware resources are described below with reference to FIGS. 6 and 7A-B.

Server $106_A$ can also include one or more host operating systems (not shown). The number of host operating system can vary by configuration. For example, some configurations can include a dual boot configuration that allows server $106_A$ to boot into one of multiple host operating systems. In other configurations, server $106_A$ may run a single host operating system. Host operating systems can run on hardware resources 212. In some cases, hypervisor 208 can run on, or utilize, a host operating system on server $106_A$. Each of the host operating systems can execute one or more processes, which may be programs, applications, modules, drivers, services, widgets, etc. Each of the host operating systems may also be associated with one or more OS user accounts.

Server $106_A$ can also have one or more network addresses, such as an internet protocol (IP) address, to communicate with other devices, components, or networks. For example, server $106_A$ can have an IP address assigned to a communications interface from hardware resources 212, which it can use to communicate with VMs 202, hypervisor 208, leaf router $104_A$ in FIG. 1, collectors 118 in FIG. 1, and/or any remote devices or networks.

VM sensors $204_{A-C}$ (collectively "204") can be deployed on one or more of VMs 202. VM sensors 204 can be data and packet inspection agents or sensors deployed on VMs 202 to capture packets, flows, processes, events, traffic, and/or any data flowing into, out of, or through VMs 202. VM sensors 204 can be configured to export or report any data collected or captured by the sensors 204 to a remote entity, such as collectors 118, for example. VM sensors 204 can communicate or report such data using a network address of the respective VMs 202 (e.g., VM IP address).

VM sensors 204 can capture and report any traffic (e.g., packets, flows, etc.) sent, received, generated, and/or processed by VMs 202. For example, sensors 204 can report every packet or flow of communication sent and received by VMs 202. Such communication channel between sensors 204 and collectors 108 creates a flow in every monitoring period or interval and the flow generated by sensors 204 may be denoted as a control flow. Moreover, any communication sent or received by VMs 202, including data reported from sensors 204, can create a network flow. VM sensors 204 can report such flows in the form of a control flow to a remote device, such as collectors 118 illustrated in FIG. 1. VM sensors 204 can report each flow separately or aggregated with other flows. When reporting a flow via a control flow, VM sensors 204 can include a sensor identifier that identifies sensors 204 as reporting the associated flow. VM sensors 204 can also include in the control flow a flow identifier, an IP address, a timestamp, metadata, a process ID, an OS username associated with the process ID, and any other information, as further described below. In addition, sensors 204 can append the process and user information (i.e., which process and/or user is associated with a particular flow) to the control flow. The additional information as identified above can be applied to the control flow as labels. Alternatively, the additional information can be included as part of a header, a trailer, or a payload.

VM sensors 204 can also report multiple flows as a set of flows. When reporting a set of flows, VM sensors 204 can include a flow identifier for the set of flows and/or a flow identifier for each flow in the set of flows. VM sensors 204 can also include one or more timestamps and other information as previously explained.

VM sensors 204 can run as a process, kernel module, or kernel driver on guest operating systems 206 of VMs 202. VM sensors 204 can thus monitor any traffic sent, received, or processed by VMs 202, any processes running on guest operating systems 206, any users and user activities on guest operating system 206, any workloads on VMs 202, etc.

Hypervisor sensor 210 can be deployed on hypervisor 208. Hypervisor sensor 210 can be a data inspection agent or a sensor deployed on hypervisor 208 to capture traffic (e.g., packets, flows, etc.) and/or data flowing through hypervisor 208. Hypervisor sensor 210 can be configured to export or report any data collected or captured by hypervisor sensor 210 to a remote entity, such as collectors 118, for example. Hypervisor sensor 210 can communicate or report such data using a network address of hypervisor 208, such as an IP address of hypervisor 208.

Because hypervisor 208 can see traffic and data originating from VMs 202, hypervisor sensor 210 can also capture and report any data (e.g., traffic data) associated with VMs 202. For example, hypervisor sensor 210 can report every packet or flow of communication sent or received by VMs 202 and/or VM sensors 204. Moreover, any communication sent or received by hypervisor 208, including data reported from hypervisor sensor 210, can create a network flow. Hypervisor sensor 210 can report such flows in the form of a control flow to a remote device, such as collectors 118 illustrated in FIG. 1. Hypervisor sensor 210 can report each flow separately and/or in combination with other flows or data. When reporting a flow, hypervisor sensor 210 can include a sensor identifier that identifies hypervisor sensor 210 as reporting the flow. Hypervisor sensor 210 can also include in the control flow a flow identifier, an IP address, a timestamp, metadata, a process ID, and any other information, as explained below. In addition, sensors 210 can append the process and user information (i.e., which process and/or user is associated with a particular flow) to the control flow. The additional information as identified above can be applied to the control flow as labels. Alternatively, the additional information can be included as part of a header, a trailer, or a payload.

Hypervisor sensor 210 can also report multiple flows as a set of flows. When reporting a set of flows, hypervisor sensor 210 can include a flow identifier for the set of flows and/or a flow identifier for each flow in the set of flows. Hypervisor sensor 210 can also include one or more timestamps and other information as previously explained, such as process and user information.

As previously explained, any communication captured or reported by VM sensors 204 can flow through hypervisor 208. Thus, hypervisor sensor 210 can observe and capture any flows or packets reported by VM sensors 204, including any control flows. Accordingly, hypervisor sensor 210 can also report any packets or flows reported by VM sensors 204 and any control flows generated by VM sensors 204. For example, VM sensor $204_A$ on VM 1 ($202_A$) captures flow 1 ("F1") and reports F1 to collector 118 on FIG. 1. Hypervisor sensor 210 on hypervisor 208 can also see and capture F1, as F1 would traverse hypervisor 208 when being sent or received by VM 1 ($202_A$). Accordingly, hypervisor sensor 210 on hypervisor 208 can also report F1 to collector 118. Thus, collector 118 can receive a report of F1 from VM sensor $204_A$ on VM 1 ($202_A$) and another report of F1 from hypervisor sensor 210 on hypervisor 208.

When reporting F1, hypervisor sensor 210 can report F1 as a message or report that is separate from the message or report of F1 transmitted by VM sensor 204$_A$ on VM 1 (202$_A$). However, hypervisor sensor 210 can also, or otherwise, report F1 as a message or report that includes or appends the message or report of F1 transmitted by VM sensor 204$_A$ on VM 1 (202$_A$). In other words, hypervisor sensor 210 can report F1 as a separate message or report from VM sensor 204$_A$'s message or report of F 1, and/or a same message or report that includes both a report of F1 by hypervisor sensor 210 and the report of F1 by VM sensor 204$_A$ at VM 1 (202$_A$). In this way, VM sensors 204 at VMs 202 can report packets or flows received or sent by VMs 202, and hypervisor sensor 210 at hypervisor 208 can report packets or flows received or sent by hypervisor 208, including any flows or packets received or sent by VMs 202 and/or reported by VM sensors 204.

Hypervisor sensor 210 can run as a process, kernel module, or kernel driver on the host operating system associated with hypervisor 208. Hypervisor sensor 210 can thus monitor any traffic sent and received by hypervisor 208, any processes associated with hypervisor 208, etc.

Server 106$_A$ can also have server sensor 214 running on it. Server sensor 214 can be a data inspection agent or sensor deployed on server 106$_A$ to capture data (e.g., packets, flows, traffic data, etc.) on server 106$_A$. Server sensor 214 can be configured to export or report any data collected or captured by server sensor 214 to a remote entity, such as collector 118, for example. Server sensor 214 can communicate or report such data using a network address of server 106$_A$, such as an IP address of server 106$_A$.

Server sensor 214 can capture and report any packet or flow of communication associated with server 106$_A$. For example, sensor 216 can report every packet or flow of communication sent or received by one or more communication interfaces of server 106$_A$. Moreover, any communication sent or received by server 106$_A$, including data reported from sensors 204 and 210, can create a network flow associated with server 106$_A$. Server sensor 214 can report such flows in the form of a control flow to a remote device, such as collector 118 illustrated in FIG. 1. Server sensor 214 can report each flow separately or in combination. When reporting a flow, server sensor 214 can include a sensor identifier that identifies server sensor 214 as reporting the associated flow. Server sensor 214 can also include in the control flow a flow identifier, an IP address, a timestamp, metadata, a process ID, and any other information. In addition, sensor 214 can append the process and user information (i.e., which process and/or user is associated with a particular flow) to the control flow. The additional information as identified above can be applied to the control flow as labels. Alternatively, the additional information can be included as part of a header, a trailer, or a payload.

Server sensor 214 can also report multiple flows as a set of flows. When reporting a set of flows, server sensor 214 can include a flow identifier for the set of flows and/or a flow identifier for each flow in the set of flows. Server sensor 214 can also include one or more timestamps and other information as previously explained.

Any communications captured or reported by sensors 204 and 210 can flow through server 106$_A$. Thus, server sensor 214 can observe or capture any flows or packets reported by sensors 204 and 210. In other words, network data observed by sensors 204 and 210 inside VMs 202 and hypervisor 208 can be a subset of the data observed by server sensor 214 on server 106$_A$. Accordingly, server sensor 214 can report any packets or flows reported by sensors 204 and 210 and any control flows generated by sensors 204 and 210. For example, sensor 204$_A$ on VM 1 (202$_A$) captures flow 1 (F1) and reports F1 to collector 118 as illustrated on FIG. 1. sensor 210 on hypervisor 208 can also observe and capture F1, as F1 would traverse hypervisor 208 when being sent or received by VM 1 (202$_A$). In addition, sensor 214 on server 106$_A$ can also see and capture F1, as F1 would traverse server 106$_A$ when being sent or received by VM 1 (202$_A$) and hypervisor 208. Accordingly, sensor 214 can also report F1 to collector 118. Thus, collector 118 can receive a report (i.e., control flow) regarding F1 from sensor 204$_A$ on VM 1 (202$_A$), sensor 210 on hypervisor 208, and sensor 214 on server 106$_A$.

When reporting F1, server sensor 214 can report F1 as a message or report that is separate from any messages or reports of F1 transmitted by sensor 204$_A$ on VM 1 (202$_A$) or sensor 210 on hypervisor 208. However, server sensor 214 can also, or otherwise, report F1 as a message or report that includes or appends the messages or reports or metadata of F1 transmitted by sensor 204$_A$ on VM 1 (202$_A$) and sensor 210 on hypervisor 208. In other words, server sensor 214 can report F1 as a separate message or report from the messages or reports of F1 from sensor 204$_A$ and sensor 210, and/or a same message or report that includes a report of F1 by sensor 204$_A$, sensor 210, and sensor 214. In this way, sensors 204 at VMs 202 can report packets or flows received or sent by VMs 202, sensor 210 at hypervisor 208 can report packets or flows received or sent by hypervisor 208, including any flows or packets received or sent by VMs 202 and reported by sensors 204, and sensor 214 at server 106$_A$ can report packets or flows received or sent by server 106$_A$, including any flows or packets received or sent by VMs 202 and reported by sensors 204, and any flows or packets received or sent by hypervisor 208 and reported by sensor 210.

Server sensor 214 can run as a process, kernel module, or kernel driver on the host operating system or a hardware component of server 106$_A$. Server sensor 214 can thus monitor any traffic sent and received by server 106$_A$, any processes associated with server 106$_A$, etc.

In addition to network data, sensors 204, 210, and 214 can capture additional information about the system or environment in which they reside. For example, sensors 204, 210, and 214 can capture data or metadata of active or previously active processes of their respective system or environment, operating system user identifiers, metadata of files on their respective system or environment, timestamps, network addressing information, flow identifiers, sensor identifiers, etc. Moreover, sensors 204, 210, 214 are not specific to any operating system environment, hypervisor environment, network environment, or hardware environment. Thus, sensors 204, 210, and 214 can operate in any environment.

As previously explained, sensors 204, 210, and 214 can send information about the network traffic they observe. This information can be sent to one or more remote devices, such as one or more servers, collectors, engines, etc. Each sensor can be configured to send respective information using a network address, such as an IP address, and any other communication details, such as port number, to one or more destination addresses or locations. Sensors 204, 210, and 214 can send metadata about one or more flows, packets, communications, processes, events, etc.

Sensors 204, 210, and 214 can periodically report information about each flow or packet they observe. The information reported can contain a list of flows or packets that were active during a period of time (e.g., between the current time and the time at which the last information was reported). The communication channel between the sensor and the destination can create a flow in every interval. For example, the communication channel between sensor 214 and collector 118 can create a control flow. Thus, the information reported by a sensor can also contain information about this control flow. For example, the information reported by sensor 214 to collector 118 can include a list of flows or packets that were active at hypervisor 208 during a period of time, as well as information about the communication channel between sensor 210 and collector 118 used to report the information by sensor 210.

FIG. 2B illustrates a schematic diagram of example sensor deployment 220 in an example network device. The network device is described as leaf router $104_A$, as illustrated in FIG. 1. However, this is for explanation purposes. The network device can be any other network device, such as any other switch, router, etc.

In this example, leaf router $104_A$ can include network resources 222, such as memory, storage, communication, processing, input, output, and other types of resources. Leaf router $104_A$ can also include operating system environment 224. The operating system environment 224 can include any operating system, such as a network operating system, embedded operating system, etc. Operating system environment 224 can include processes, functions, and applications for performing networking, routing, switching, forwarding, policy implementation, messaging, monitoring, and other types of operations.

Leaf router $104_A$ can also include sensor 226. Sensor 226 can be an agent or sensor configured to capture network data, such as flows or packets, sent received, or processed by leaf router $104_A$. Sensor 226 can also be configured to capture other information, such as processes, statistics, users, alerts, status information, device information, etc. Moreover, sensor 226 can be configured to report captured data to a remote device or network, such as collector 118 shown in FIG. 1, for example. Sensor 226 can report information using one or more network addresses associated with leaf router $104_A$ or collector 118. For example, sensor 226 can be configured to report information using an IP assigned to an active communications interface on leaf router $104_A$.

Leaf router $104_A$ can be configured to route traffic to and from other devices or networks, such as server $106_A$. Accordingly, sensor 226 can also report data reported by other sensors on other devices. For example, leaf router $104_A$ can be configured to route traffic sent and received by server $106_A$ to other devices. Thus, data reported from sensors deployed on server $106_A$, such as VM and hypervisor sensors on server $106_A$, would also be observed by sensor 226 and can thus be reported by sensor 226 as data observed at leaf router $104_A$. Such report can be a control flow generated by sensor 226. Data reported by the VM and hypervisor sensors on server $106_A$ can therefore be a subset of the data reported by sensor 226.

Sensor 226 can run as a process or component (e.g., firmware, module, hardware device, etc.) in leaf router $104_A$. Moreover, sensor 226 can be installed on leaf router $104_A$ as a software or firmware agent. In some configurations, leaf router $104_A$ itself can act as sensor 226. Moreover, sensor 226 can run within operating system 224 and/or separate from operating system 224.

FIG. 2C illustrates a schematic diagram of example reporting system 240 in an example sensor topology. Leaf router $104_A$ can route packets or traffic 242 between fabric 112 and server $106_A$, hypervisor $108_A$, and VM $110_A$. Packets or traffic 242 between VM $110_A$ and leaf router $104_A$ can flow through hypervisor $108_A$ and server $106_A$. Packets or traffic 242 between hypervisor $108_A$ and leaf router $104_A$ can flow through server $106_A$. Finally, packets or traffic 242 between server $106_A$ and leaf router $104_A$ can flow directly to leaf router $104_A$. However, in some cases, packets or traffic 242 between server $106_A$ and leaf router $104_A$ can flow through one or more intervening devices or networks, such as a switch or a firewall.

Moreover, VM sensor $204_A$ at VM $110_A$, hypervisor sensor 210 at hypervisor $108_A$, network device sensor 226 at leaf router $104_A$, and any server sensor at server $106_A$ (e.g., sensor running on host environment of server $106_A$) can send reports 244 (also referred to as control flows) to collector 118 based on the packets or traffic 242 captured at each respective sensor. Reports 244 from VM sensor $204_A$ to collector 118 can flow through VM $110_A$, hypervisor $108_A$, server $106_A$, and leaf router $104_A$. Reports 244 from hypervisor sensor 210 to collector 118 can flow through hypervisor $108_A$, server $106_A$, and leaf router $104_A$. Reports 244 from any other server sensor at server $106_A$ to collector 118 can flow through server $106_A$ and leaf router $104_A$. Finally, reports 244 from network device sensor 226 to collector 118 can flow through leaf router $104_A$. Although reports 244 are depicted as being routed separately from traffic 242 in FIG. 2C, one of ordinary skill in the art will understand that reports 244 and traffic 242 can be transmitted through the same communication channel(s).

Reports 244 can include any portion of packets or traffic 242 captured at the respective sensors. Reports 244 can also include other information, such as timestamps, process information, sensor identifiers, flow identifiers, flow statistics, notifications, logs, user information, system information, addresses, ports, protocols, etc. Some or all of this information can be appended to reports 244 as one or more labels, metadata, or as part of the packet(s)' header, trailer, or payload. For example, if a user opens a browser on VM $110_A$ and navigates to examplewebsite.com, VM sensor $204_A$ of VM $110_A$ can determine which user (i.e., operating system user) of VM $110_A$ (e.g., username "johndoe85") and which process being executed on the operating system of VM $110_A$ (e.g., "chrome.exe") were responsible for the particular network flow to and from examplewebsite.com. Once such information is determined, the information can be included in report 244 as labels for example, and report 244 can be transmitted from VM sensor $204_A$ to collector 118. Such additional information can help system 240 to gain insight into flow information at the process and user level, for instance. This information can be used for security, optimization, and determining structures and dependencies within system 240. Moreover, reports 244 can be transmitted to collector 118 periodically as new packets or traffic 242 are captured by a sensor. Further, each sensor can send a single report or multiple reports to collector 118. For example, each of the sensors 116 can be configured to send a report to collector 118 for every flow, packet, message, communication, or network data received, transmitted, and/or generated by its respective host (e.g., VM $110_A$, hypervisor $108_A$, server $106_A$, and leaf router $104_A$). As such, collector 118 can receive a report of a same packet from multiple sensors.

For example, a packet received by VM $110_A$ from fabric 112 can be captured and reported by VM sensor $204_A$. Since the packet received by VM $110_A$ will also flow through leaf router $104_A$ and hypervisor $108_A$, it can also be captured and reported by hypervisor sensor 210 and network device sensor 226. Thus, for a packet received by VM $110_A$ from fabric 112, collector 118 can receive a report of the packet from VM sensor $204_A$, hypervisor sensor 210, and network device sensor 226.

Similarly, a packet sent by VM 110$_A$ to fabric 112 can be captured and reported by VM sensor 204$_A$. Since the packet sent by VM 110$_A$ will also flow through leaf router 104$_A$ and hypervisor 108$_A$, it can also be captured and reported by hypervisor sensor 210 and network device sensor 226. Thus, for a packet sent by VM 110$_A$ to fabric 112, collector 118 can receive a report of the packet from VM sensor 204$_A$, hypervisor sensor 210, and network device sensor 226.

On the other hand, a packet originating at, or destined to, hypervisor 108$_A$, can be captured and reported by hypervisor sensor 210 and network device sensor 226, but not VM sensor 204$_A$, as such packet may not flow through VM 110$_A$. Moreover, a packet originating at, or destined to, leaf router 104$_A$, will be captured and reported by network device sensor 226, but not VM sensor 204$_A$, hypervisor sensor 210, or any other sensor on server 106$_A$, as such packet may not flow through VM 110$_A$, hypervisor 108$_A$, or server 106$_A$.

Each of the sensors 204$_A$, 210, 226 can include a respective unique sensor identifier on each of reports 244 it sends to collector 118, to allow collector 118 to determine which sensor sent the report. Reports 244 can be used to analyze network and/or system data and conditions for troubleshooting, security, visualization, configuration, planning, and management. Sensor identifiers in reports 244 can also be used to determine which sensors reported what flows. This information can then be used to determine sensor placement and topology, as further described below, as well as mapping individual flows to processes and users. Such additional insights gained can be useful for analyzing the data in reports 244, as well as troubleshooting, security, visualization, configuration, planning, and management.

FIG. 3 illustrates a sequence diagram of an example communication 300 between a sensor and a control server in a network. In this example, the communication 300 between a sensor 302 and a control server 304, one or more messages such as messages 1-2 (306-308) may be exchanged between the sensor 302 and the control server 304. After the sensor 302 is installed on a host component (e.g., a host VM), the sensor 302 can send attributes of the sensor 302 to the control server 304 via a message 1 (306). The message 1 (306) includes at least one unique identifier of the sensor 302 or the host component of the sensor 302.

In response to receiving the attributes of the sensor 302, the control server 304 can determine a hash value, using a one-way hash function and a secret key, based upon the attributes of the sensor 302. In some examples, the hash value is a fixed length hash value that is independent from the length of an input string to generate the hash value. The one-way hash function includes, HMAC, MD2, MD4, MD5, SHA-1, SHA-2, and SHA-3.

The control server 304 can then send the hash value to the sensor 302 and designate the hash value as a sensor ID of the sensor. In response to receiving the sensor ID, the sensor 302 incorporates the sensor ID in all subsequent communication messages. Other components, nodes or sensors of the network can receive communication message(s) from the sensor 302, and further verify the validity of the sensor 302. For example, a backend server of the network can determine a hash value based upon attributes of the sensor 302 using the one-way hash function and the secret key. If the hash value is inconsistent with the sensor ID that is incorporated in the communication message(s) of the sensor 302, the backend server can determine that the sensor 302 may be under an attack and can generate a warning report.

As one of skill in the art will appreciate, some of all of the various methods and rules—timing, degree, magnitude, graph consistency, historical data, hash function, etc.—as described in this disclosure can be used in combination. Different weights can also be assigned to different rules and methods depending on the accuracy, margin of error, etc. of each rule or method.

Having disclosed some basic system components and concepts, the disclosure now turns to the exemplary method examples shown in FIGS. 4-5. For the sake of clarity, the methods are described in terms of system 100, as shown in FIG. 1, configured to practice the method. However, the example methods can be practiced by any software or hardware components, devices, etc. heretofore disclosed, such as system 200 of FIG. 2A, system 220 of FIG. 2B, system 600 of FIG. 6, system 700 of FIG. 7A, system 750 of FIG. 7B, etc. The steps outlined herein are exemplary and can be implemented in any combination thereof in any order, including combinations that exclude, add, or modify certain steps.

FIG. 4 illustrates an example method 400 for generating a unique ID for a sensor in a network, according to some examples. It should be understood that the exemplary method 400 is presented solely for illustrative purposes and that in other methods in accordance with the present technology can include additional, fewer, or alternative steps performed in similar or alternative orders, or in parallel. The system 100 can receive a message from the sensor, at step 402. The message comprises attributes of the sensor that includes at least one unique identifier of the sensor or the host component of the sensor. The host component can be an endpoint, a terminal, a server, a virtual machine, a hypervisor, a switch, a gateway, etc. The at least one unique identifier of the sensor or the host component of the sensor may include host name, MAC address, and BIOS_UUID etc.

Based on the at least one unique identifier of the sensor or the host component of the sensor, the system 100 can determine a sensor ID for the sensor, at step 404. For example, the system 100 can determine a hash value using a one-way hash function and a secret key and designate the hash value as the sensor ID for the sensor. The one-way hash function may include HMAC, MD2, MD4, MD5, SHA-1, SHA-2, SHA-3, and KECCAK.

The system 100 can then send the sensor ID to the sensor, at step 406, and cause the sensor to incorporate the sensor ID and attributes of the sensor (e.g., the at least one unique identifier of the sensor or the host component of the sensor) in all subsequent communication messages. The system 100 or a component may receive or collect the subsequent communication messages from the sensor, at step 408. The system 100 can further determine a hash value based upon received attributes of the sensor using the one-way hash function and the secret key, and compare the hash value with the sensor ID incorporated in the subsequent communication message(s), at step 410.

In response to determining that the hash value is consistent with the sensor ID, the method 400 returns to step 408 to receive or monitor additional communication message(s) from the sensor. In response to determining that the hash value is inconsistent with the sensor ID, the system 100 may generate a warning report, at step 412, to indicate that the system 100 or the senor may be under an attack.

FIG. 5 illustrates another example method 500 for generating a unique ID for a sensor in a network, according to some examples. In this example, the system 100 can determine that a sensor is installed on a host component, at step 502, and then cause the sensor to send attribute of the sensor to a control server of the network, at step 504. The attributes includes at least one unique identifier of the sensor or the host component of the sensor that comprises host name, MAC address, and BIOS_UUID of the host component.

The system 100 can further cause the control server to determine a sensor ID for the sensor. The sensor ID can be used to uniquely identify the sensor in the network. The sensor ID is a hash value determined using a one-way hash function, a secret key, and the at least one unique identifier of the sensor or the host component of the sensor.

The sensor receives the sensor ID from the control server, at step 506. The system 100 can further cause the sensor to incorporate the sensor ID and the at least one unique identifier in all subsequent communication messages, at step 508. The system 100 can verify the sensor based upon the sensor ID incorporated in the subsequent communication message(s) from the sensor.

Example Devices

FIG. 6 illustrates an example network device 600 according to some examples. Network device 600 includes a master central processing unit (CPU) 602, interfaces 604, and a bus 606 (e.g., a PCI bus). When acting under the control of appropriate software or firmware, the CPU 602 is responsible for executing packet management, error detection, and/or routing functions. The CPU 602 preferably accomplishes all these functions under the control of software including an operating system and any appropriate applications software. CPU 602 may include one or more processors 610 such as a processor from the Motorola family of microprocessors or the MIPS family of microprocessors. In an alternative example, processor 610 is specially designed hardware for controlling the operations of router. In a specific example, a memory 608 (such as non-volatile RAM and/or ROM) also forms part of CPU 602. However, there are many different ways in which memory could be coupled to the system.

The interfaces 604 are typically provided as interface cards (sometimes referred to as "line cards"). Generally, they control the sending and receiving of data packets over the network and sometimes support other peripherals used with the router. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 602 to efficiently perform routing computations, network diagnostics, security functions, etc.

Although the system shown in FIG. 6 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 608) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 7A and FIG. 7B illustrate example system examples. The more appropriate example will be apparent to those of ordinary skill in the art when practicing the present technology. Persons of ordinary skill in the art will also readily appreciate that other system examples are possible.

FIG. 7A illustrates a conventional system bus computing system architecture 700 wherein the components of the system are in electrical communication with each other using a bus 712. Exemplary system 700 includes a processing unit (CPU or processor) 702 and a system bus 712 that couples various system components including the system memory 706, such as read only memory (ROM) 708 and random access memory (RAM) 710, to the processor 702. The system 700 can include a cache of high-speed memory connected directly with, in close proximity to, or integrated as part of the processor 702. The system 700 can copy data from the memory 706 and/or the storage device 720 to the cache 704 for quick access by the processor 702. In this way, the cache can provide a performance boost that avoids processor 702 delays while waiting for data. These and other modules can control or be configured to control the processor 702 to perform various actions. Other system memory 706 may be available for use as well. The memory 706 can include multiple different types of memory with different performance characteristics. The processor 702 can include any general purpose processor and a hardware module or software module, such as module 1 (722), module 2 (724), and module 3 (726) stored in storage device 720, configured to control the processor 702 as well as a special-purpose processor where software instructions are incorporated into the actual processor design. The processor 702 may essentially be a completely self-contained computing system, containing multiple cores or processors, a bus, memory controller, cache, etc. A multi-core processor may be symmetric or asymmetric.

To enable user interaction with the system 700, an input device 714 can represent any number of input mechanisms, such as a microphone for speech, a touch-sensitive screen for gesture or graphical input, keyboard, mouse, motion input, speech and so forth. An output device 716 can also be one or more of a number of output mechanisms known to those of skill in the art. In some instances, multimodal systems can enable a user to provide multiple types of input to communicate with the system 700. The communications interface 718 can generally govern and manage the user input and system output. There is no restriction on operating on any particular hardware arrangement and therefore the basic features here may easily be substituted for improved hardware or firmware arrangements as they are developed.

Storage device 720 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 710, read only memory (ROM) 708, and hybrids thereof.

The storage device 720 can include software modules 722, 724, 726 for controlling the processor 702. Other hardware or software modules are contemplated. The storage device 720 can be connected to the system bus 712. In one aspect, a hardware module that performs a particular function can include the software component stored in a computer-readable medium in connection with the necessary hardware components, such as the processor 702, bus 712, display 716, and so forth, to carry out the function.

FIG. 7B illustrates an example computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 752, representative of any number of physically and/or logically distinct resources capable of executing software, firmware, and hardware configured to perform identified computations. Processor 752 can communicate with a chipset 754 that can control input to and output from processor 752. In this example, chipset 754 outputs information to output device 756, such as a display, and can read and write information to storage device 758, which can include magnetic media, and solid state media, for example. Chipset 754 can also read data from and write data to RAM 760. A bridge 762 for interfacing with a variety of user interface components 764 can be provided for interfacing with chipset 754. Such user interface components 764 can include a keyboard, a microphone, touch detection and processing circuitry, a pointing device, such as a mouse, and so on. In general, inputs to system 750 can come from any of a variety of sources, machine generated and/or human generated.

Chipset 754 can also interface with one or more communication interfaces 766 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 752 analyzing data stored in storage 758 or 760. Further, the machine can receive inputs from a user via user interface components 764 and execute appropriate functions, such as browsing functions by interpreting these inputs using processor 752.

It can be appreciated that example systems 700 and 750 can have more than one processor 702 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some examples the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other examples or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or examples, and should not be interpreted to suggest that such features or configurations cannot be combined with features or configurations described with reference to other examples, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various examples or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

The invention claimed is:

1. A method comprising:
   receiving, at a sensor configured to capture network data, a new sensor identifier configured to uniquely identify the sensor, wherein the new sensor identifier is generated based on at least one attribute associated with the sensor; and
   incorporating the new sensor identifier, to replace a previous sensor identifier, in messages subsequently sent from the sensor.

2. The method of claim 1, wherein the new sensor identifier is a fixed-length hash value based upon various lengths of the at least one attribute.

3. The method of claim 1, wherein the new sensor identifier replaces the previous sensor identifier.

4. The method of claim 1, further comprising:
   prior to receiving the new sensor identifier, determining the sensor is installed on a component in a network; and
   sending the at least one attribute of the sensor.

5. The method of claim 1, further comprising:
   prior to receiving the new sensor identifier, sending a first message comprising the at least one attribute from the sensor.

6. The method of claim 5, further comprising:
   sending a second message comprising at least the new sensor identifier; and
   based at least on the new sensor identifier, determining the sensor is under an attack.

7. The method of claim 6, wherein determining the sensor is under the attack is based on a match between the new sensor identifier and a hash value.

8. A system comprising:
   a sensor configured to capture network data;
   at least one processor;
   at least one memory storing instructions, which when executed by the at least one processor, causes the at least one processor to:
     receive, at the sensor, a new sensor identifier configured to uniquely identify the sensor, wherein the new sensor identifier is generated based on at least one attribute associated with the sensor; and
     incorporate the new sensor identifier, to replace a previous sensor identifier, in messages subsequently sent from the sensor.

9. The system of claim 8, wherein the new sensor identifier is a fixed-length hash value based upon various lengths of the at least one attribute.

10. The system of claim 8, wherein the new sensor identifier replaces the previous sensor identifier.

11. The system of claim 8, further comprising instructions, which when executed by the at least one processor, causes the at least one processor to:
    prior to receiving the new sensor identifier, determine the sensor is installed on a component in a network; and
    send the at least one attribute of the sensor.

12. The system of claim 8, further comprising instructions, which when executed by the at least one processor, causes the at least one processor to:
    prior to receiving the new sensor identifier, send a first message comprising the at least one attribute from the sensor.

13. The system of claim 12, instructions, which when executed by the at least one processor, causes the at least one processor to:
    send a second message comprising at least the new sensor identifier,
    wherein, based at least on the new sensor identifier, determine, at a system that received the second message, the sensor is under an attack.

14. The system of claim 13, wherein determining the sensor is under the attack is based on a match between the new sensor identifier and a hash value.

15. A system comprising:
    at least one processor;
    at least one memory storing instructions, which when executed by the at least one processor, causes the at least one processor to:
      determine a new sensor identifier for a sensor configured to capture network data, the new sensor identifier configured to uniquely identify the sensor, wherein the new sensor identifier is generated based on at least one attribute associated with the sensor; and
      send the new sensor identifier to the sensor.

16. The system of claim 15, wherein the new sensor identifier is a fixed-length hash value based upon various lengths of the at least one attribute.

17. The system of claim 15, further comprising instructions, which when executed by the at least one processor, causes the at least one processor to:
    prior to determining the new sensor identifier, determine the sensor is installed on a component in a network; and
    receive the at least one attribute of the sensor.

18. The system of claim 15, further comprising instructions, which when executed by the at least one processor, causes the at least one processor to:
    prior to determining the new sensor identifier, receive a first message comprising the at least one attribute from the sensor.

19. The system of claim 18, instructions, which when executed by the at least one processor, causes the at least one processor to:
    receive a second message comprising at least the new sensor identifier; and
    based at least on the new sensor identifier, determine the sensor is under an attack.

20. The system of claim 19, wherein determining the sensor is under the attack is based on a match between the new sensor identifier and a hash value.

* * * * *